(12) United States Patent
Osamura et al.

(10) Patent No.: US 12,451,159 B2
(45) Date of Patent: Oct. 21, 2025

(54) MAGNETIC RECORDING MEDIUM WITH VARYING COMPOSITION RATIO AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Ryo Osamura, Kawasaki Kanagawa (JP); Yuji Nakagawa, Kawasaki Kanagawa (JP); Tomoyuki Maeda, Kawasaki Kanagawa (JP); Masayuki Takagishi, Tokyo (JP); Naoyuki Narita, Funabashi Chiba (JP); Kosuke Kurihara, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/363,423

(22) Filed: Aug. 1, 2023

(65) Prior Publication Data
US 2024/0185884 A1  Jun. 6, 2024

(30) Foreign Application Priority Data

Dec. 6, 2022  (JP) .................. 2022-194583

(51) Int. Cl.
*G11B 5/66* (2006.01)
*G11B 5/127* (2006.01)
(Continued)

(52) U.S. Cl.
CPC ............ *G11B 5/672* (2021.05); *G11B 5/1278* (2013.01); *G11B 5/656* (2013.01); *G11B 5/667* (2013.01);
(Continued)

(58) Field of Classification Search
None
See application file for complete search history.

(56) References Cited

U.S. PATENT DOCUMENTS 7,616,412 B2  11/2009  Zhu et al.
9,007,721 B2   4/2015  Sato et al.
(Continued)

FOREIGN PATENT DOCUMENTS

JP   2008-277586 A   11/2008
JP   2009-064499 A    3/2009
(Continued)

OTHER PUBLICATIONS

Office Action issued in U.S. Appl. No. 18/358,677 dated Oct. 15, 2024 in 24 pages.
(Continued)

*Primary Examiner* — Craig A. Renner
(74) *Attorney, Agent, or Firm* — Knobbe, Martens, Olson & Bear, LLP

(57) ABSTRACT

According to one embodiment, a magnetic recording medium includes a first magnetic region, a second magnetic region, and a third magnetic region. The second magnetic region is provided between the third magnetic region and the first magnetic region in a first direction from the third magnetic region to the first magnetic region. A first composition ratio of a first Pt atomic concentration in the first magnetic region to a first Co atomic concentration in the first magnetic region is higher than a second composition ratio of a second Pt atomic concentration in the second magnetic region to a second Co atomic concentration in the second magnetic region. A third composition ratio of a third Pt atom concentration in the third magnetic region to a third Co atom concentration in the third magnetic region is higher than the second composition ratio.

15 Claims, 15 Drawing Sheets

(51) Int. Cl.
*G11B 5/65* (2006.01)
*G11B 5/667* (2006.01)
*G11B 5/82* (2006.01)
*G11B 5/00* (2006.01)

(52) U.S. Cl.
CPC ............... *G11B 5/678* (2021.05); *G11B 5/82* (2013.01); *G11B 2005/0024* (2013.01)

(56) References Cited

U.S. PATENT DOCUMENTS

| | | |
|---|---|---|
| 9,064,508 B1 | 6/2015 | Shiimoto et al. |
| 9,117,474 B1 | 8/2015 | Contreras et al. |
| 10,325,618 B1 | 6/2019 | Wu et al. |
| 10,522,174 B1 | 12/2019 | Chen et al. |
| 10,714,129 B1 | 7/2020 | Tang et al. |
| 10,937,450 B1 | 3/2021 | Kawasaki et al. |
| 11,393,493 B1 | 7/2022 | Nakagawa et al. |
| 11,398,244 B2 | 7/2022 | Takagishi et al. |
| 11,568,891 B1 | 1/2023 | Chen et al. |
| 2005/0053805 A1* | 3/2005 | Hinoue et al. ......... G11B 5/672 428/828.1 |
| 2006/0051620 A1* | 3/2006 | Hinoue et al. ......... G11B 5/672 428/828.1 |
| 2006/0057429 A1* | 3/2006 | Hinoue et al. ......... G11B 5/672 428/829 |
| 2006/0292401 A1* | 12/2006 | Suzuki et al. ......... G11B 5/672 428/828.1 |
| 2008/0019040 A1 | 1/2008 | Zhu et al. |
| 2008/0268291 A1 | 10/2008 | Akiyama et al. |
| 2009/0052095 A1 | 2/2009 | Yamada et al. |
| 2009/0059417 A1 | 3/2009 | Takeo et al. |
| 2009/0197120 A1* | 8/2009 | Taguchi et al. ......... G11B 5/678 428/800 |
| 2009/0258253 A1* | 10/2009 | Hinoue et al. ......... G11B 5/672 428/829 |
| 2012/0126905 A1 | 5/2012 | Zhang et al. |
| 2012/0164487 A1 | 6/2012 | Childress et al. |
| 2012/0176702 A1 | 7/2012 | Yamada et al. |
| 2013/0050869 A1 | 2/2013 | Nagasaka et al. |
| 2015/0043106 A1 | 2/2015 | Yamada et al. |
| 2016/0027455 A1 | 1/2016 | Kudo et al. |
| 2019/0088275 A1 | 3/2019 | Narita et al. |
| 2020/0090685 A1 | 3/2020 | Takagishi et al. |
| 2020/0294537 A1 | 9/2020 | Nagawawa et al. |
| 2020/0381012 A1 | 12/2020 | Chembrolu et al. |
| 2020/0402532 A1 | 12/2020 | Asif Bashir et al. |
| 2021/0125631 A1 | 4/2021 | Bai et al. |
| 2021/0142821 A1 | 5/2021 | Iwasaki et al. |
| 2021/0375309 A1 | 12/2021 | Iwasaki et al. |
| 2022/0005497 A1 | 1/2022 | Takagishi et al. |
| 2022/0084551 A1 | 3/2022 | Koizumi |
| 2022/0157335 A1 | 5/2022 | Iwasaki et al. |
| 2022/0270640 A1 | 8/2022 | Nakagawa et al. |
| 2022/0270641 A1 | 8/2022 | Nakagawa et al. |
| 2022/0399035 A1 | 12/2022 | Goncharov et al. |
| 2023/0031273 A1 | 2/2023 | Nakagawa et al. |
| 2023/0046928 A1 | 2/2023 | Nakagawa et al. |
| 2023/0178102 A1 | 6/2023 | Nakagawa et al. |
| 2023/0386510 A1 | 11/2023 | Nakagawa et al. |
| 2024/0029759 A1 | 1/2024 | Chen et al. |
| 2024/0144961 A1 | 5/2024 | Asif Bashir et al. |
| 2024/0144962 A1 | 5/2024 | Asif Bashir et al. |
| 2024/0144963 A1 | 5/2024 | Asif Bashir et al. |
| 2024/0296861 A1 | 9/2024 | Nakagawa et al. |
| 2024/0296862 A1 | 9/2024 | Nakagawa et al. |
| 2024/0296863 A1 | 9/2024 | Nakagawa et al. |
| 2024/0296864 A1 | 9/2024 | Nakagawa et al. |
| 2024/0296865 A1 | 9/2024 | Nakagawa et al. |

FOREIGN PATENT DOCUMENTS

| | | |
|---|---|---|
| JP | 4358279 B2 | 11/2009 |
| JP | 2012-146351 A | 8/2012 |
| JP | 2019-057338 A | 4/2019 |
| JP | 2022-012263 A | 1/2022 |
| JP | 2022-050037 A | 3/2022 |
| JP | 2022-129730 A | 9/2022 |
| JP | 2023-083663 A | 6/2023 |

OTHER PUBLICATIONS

Final Office Action of corresponding U.S. Appl. No. 18/363,613 issued on Apr. 22, 2024 in 10 pages.

X. Bai and J.-G. Zhu, "Effective Field Analysis of Segmented Media for Microwave-Assisted Magnetic Recording", in IEEE Magnetics Letters, vol. 8, pp. 1-4, 2017.

T. Tanaka, et al., "MAMR writability and signal-recording characteristics on granular exchange-coupled composite media" in Journal of Magnetism and Magnetic Materials 529 (2021).

Office Action issued in U.S. Appl. No. 18/363,624, dated Sep. 19, 2024 in 18 pages.

Office Action issued in U.S. Appl. No. 18/363,573, dated Oct. 8, 2024 in 25 pages.

Office Action of corresponding U.S. Appl. No. 18/358,872 issued on Jun. 18, 2024, 18 pages.

Sharrock, "Measurement and Interpretation of Magnetic Time Effects in Recording Media", IEEE Transactions on Magnetics, Nov. 1999, vol. 35, No. 6, pp. 4414-4422.

* cited by examiner d1>d2
Jex1<Jex2 d1>d2
Jex1<Jex2 d1>d2
Jex1<Jex2

MAGNETIC RECORDING MEDIUM WITH VARYING COMPOSITION RATIO AND MAGNETIC RECORDING DEVICE

CROSS-REFERENCE TO RELATED APPLICATIONS

This application is based upon and claims the benefit of priority from Japanese Patent Application No. 2022-194583, filed on Dec. 6, 2022; the entire contents of which are incorporated herein by reference.

FIELD

Embodiments described herein relate generally to a magnetic recording medium and a magnetic recording device.

BACKGROUND

Information is recorded on a magnetic recording medium such as an HDD (Hard Disk Drive) using a magnetic head. Improvements in recording density are desired in magnetic recording media.

DETAILED DESCRIPTION

Figure 1:
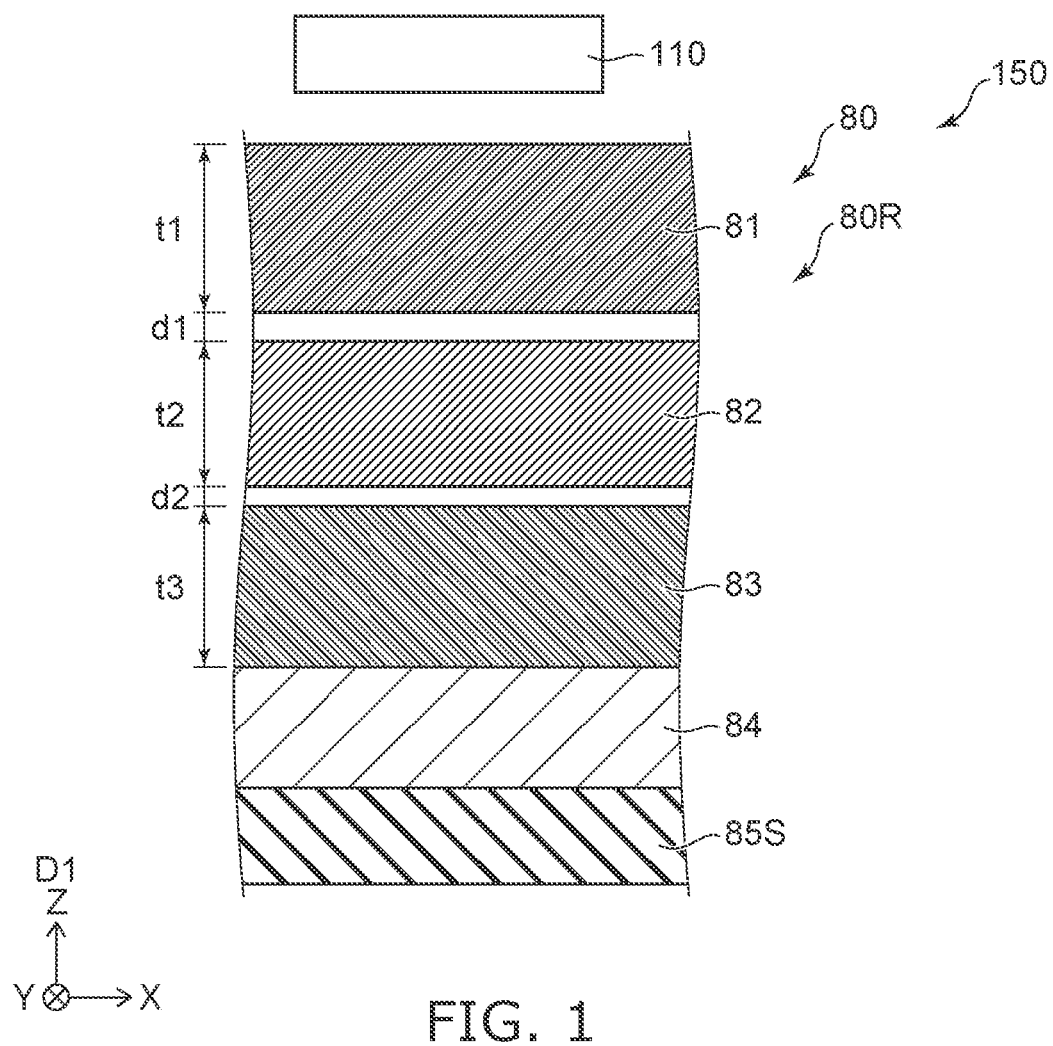
FIG. 1 is a schematic cross-sectional view illustrating a magnetic recording medium according to a first embodiment.

According to one embodiment, a magnetic recording medium includes a first magnetic region, a second magnetic region, and a third magnetic region. The second magnetic region is provided between the third magnetic region and the first magnetic region in a first direction from the third magnetic region to the first magnetic region. A first composition ratio of a first Pt atomic concentration in the first magnetic region to a first Co atomic concentration in the first magnetic region is higher than a second composition ratio of a second Pt atomic concentration in the second magnetic region to a second Co atomic concentration in the second magnetic region. A third composition ratio of a third Pt atom concentration in the third magnetic region to a third Co atom concentration in the third magnetic region is higher than the second composition ratio. A first distance along the first direction between the second magnetic region and the first magnetic region is longer than a second distance along the first direction between the third magnetic region and the second magnetic region. Or the first magnetic region is separated from the second magnetic region and the third magnetic region is in contact with the second magnetic region.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic recording medium according to a first embodiment.

As shown in FIG. 1, a magnetic recording medium 80 according to the embodiment is used together with a magnetic head 110. The magnetic recording medium 80 and the magnetic head 110 are included in a magnetic recording device 150. Magnetization of the magnetic recording medium 80 is controlled by the magnetic head 110. Thereby, information is recorded on the magnetic recording medium 80. The magnetic head 110 may be capable of reproducing the recorded information.

As shown in FIG. 1, the magnetic recording medium 80 includes a first magnetic region 81, a second magnetic region 82 and a third magnetic region 83. The first magnetic region 81, the second magnetic region 82 and the third magnetic region 83 are included in the recording layer 80R.

The second magnetic region 82 is provided between the third magnetic region 83 and the first magnetic region 81 in a first direction D1 from the third magnetic region 83 to the first magnetic region 81. The first direction D1 is defined as a Z-axis direction. One direction perpendicular to the Z-axis direction is defined as an X-axis direction. A direction perpendicular to the Z-axis direction and the X-axis direction is defined as a Y-axis direction. The first magnetic region 81, the second magnetic region 82 and the third magnetic region 83 are substantially parallel to the X-Y plane. These regions are layered.

The magnetization of the first magnetic region 81, the magnetization of the second magnetic region 82, and the magnetization of the third magnetic region are along the first direction D1. The magnetic recording medium 80 is a perpendicular magnetization medium.

For example, the first magnetic region 81, the second magnetic region 82 and the third magnetic region 83 are granular magnetic regions. For example, high density recording is possible.

As shown in FIG. 1, the magnetic recording medium 80 may include a non-magnetic substrate 85S and an intermediate layer 84. The third magnetic region 83 is provided between the non-magnetic substrate 85S and the first magnetic region 81. The intermediate layer 84 is provided between the non-magnetic substrate 85S and the third magnetic region 83. The intermediate layer 84 is, for example, soft magnetic. The non-magnetic substrate 85S includes, for example, at least one selected from the group consisting of $SiO_2$ (e.g., glass), Al-based alloys, ceramics, and resins. The intermediate layer 84 includes, for example, at least one selected from the group consisting of CoZrNb, CoB, CoTaZr, FeSiAl, FeTaC, CoTaC, NiFe, Fe, FeCoB, FeCON, and FeTaN.

As shown in FIG. 1, in the embodiment, the first magnetic region 81 is positioned between the third magnetic region 83 and the magnetic head 110.

The three magnetic regions differ in composition from each other. The composition ratios of the three magnetic regions are different from each other. The composition ratio in each of the three magnetic regions may be, for example, an average composition ratio.

A ratio (Pt/Co) of a first Pt atomic concentration in the first magnetic region 81 to a first Co atomic concentration in the first magnetic region 81 is defined as a first composition ratio. An average of the first composition ratio in the first direction D1 is defined as a first average value AC1. A difference between the highest value and the lowest value of the first composition ratio in the first magnetic region 81 is set as the first difference $\Delta C1$.

For example, the first ratio (AC1/AC1) of the first difference $\Delta C1$ to the first average value AC1 is 0.2 or less. That is, in the first magnetic region 81, the composition ratio may vary within 20%. The first ratio may be 0.4 or less.

A ratio (Pt/Co) of a second Pt atomic concentration in the second magnetic region 82 to a second Co atomic concentration in the second magnetic region 82 is defined as a second composition ratio. An average of the second composition ratio in the first direction D1 is defined as a second average value $\Delta C2$. A difference between the highest value and the lowest value of the second composition ratio in the second magnetic region 82 is defined as a second difference $\Delta C2$.

For example, the second ratio ($\Delta C2/\Delta C2$) of the second difference $\Delta C2$ to the second average value $\Delta C2$ is 0.2 or less. That is, in the second magnetic region 82, the composition ratio may vary within 20%. The second ratio may be 0.4 or less.

A ratio (Pt/Co) of a third Pt atomic concentration in the third magnetic region 83 to a third Co atomic concentration in the third magnetic region 83 is defined as a third composition ratio. An average of the third composition ratio in the first direction D1 is defined as a third average value $\Delta C3$. A difference between the highest value and the lowest value of the third composition ratio in the third magnetic region 83 is defined as a third difference $\Delta C3$.

For example, the third ratio ($\Delta C3/\Delta C3$) of the third difference $\Delta C3$ to the third average value $\Delta C3$ is 0.2 or less. That is, in the third magnetic region 83, the composition ratio may vary within 20%. The third ratio may be 0.4 or less.

In the embodiments, the first composition ratio is higher than the second composition ratio. The third composition ratio is higher than the second composition ratio. For example, in the embodiment, the first average value $\Delta C1$ is higher than the second average value $\Delta C2$. The third average value $\Delta C3$ is higher than the second average value $\Delta C2$.

As shown in FIG. 1, a distance along the first direction D1 between the second magnetic region 82 and the first magnetic region 81 is defined as a first distance d1. A distance along the first direction D1 between the third magnetic region 83 and the second magnetic region 82 is defined as a second distance d2. In the embodiment, the first distance d1 is longer than the second distance d2. Alternatively, the first magnetic region 81 is separated from the second magnetic region 82, and the third magnetic region 83 is in contact with the second magnetic region 82.

It has been found that high areal recording density can be obtained by such a configuration. As shown in FIG. 1, the magnetic head 110 faces a surface of the recording layer 80R. The recording magnetic field is applied to the recording layer 80R from the magnetic head 110. At this time, for example, an alternating magnetic field may be applied from the magnetic head 110 to the recording layer 80R. The alternating magnetic field is, for example, a high-frequency magnetic field. For example, MAMR (Microwave Assisted Magnetic Recording) may be performed. The recording magnetic field and alternating magnetic field applied by the magnetic head 110 pass through the first magnetic region 81 and reach the second magnetic region 82 and the third magnetic region 83. According to the embodiment, a magnetic recording medium capable of improving the recording density can be provided.

In the embodiment, as described above, the first distance d1 is longer than the second distance d2. Thereby, a high areal recording density can be obtained. This is considered to be due to the configuration that the magnetic characteristics (including exchange coupling) of the three magnetic regions are set appropriately.

By the first distance d1 being longer than the second distance d2, the exchange coupling strength is different. For example, the first exchange coupling strength between the second magnetic region 82 and the first magnetic region 81 is lower than the second exchange coupling strength between the third magnetic region 83 and the second magnetic region 82.

For example, in a case also where the first magnetic region 81 is separated from the second magnetic region 82 and the third magnetic region 83 is in contact with the second magnetic region 82, the first exchange coupling strength is lower than the second exchange coupling strength.

As described above, the compositions (e.g., the average composition ratio) in each of the three magnetic regions are different from each other. When the ratio of Pt atom concentration to Co atom concentration (Pt/Co) is high, the anisotropic magnetic field Hk in the magnetic region becomes large. When this ratio is low, the anisotropic magnetic field Hk in the magnetic region becomes small.

The anisotropic magnetic fields (e.g., the average anisotropic magnetic field) in each of the three magnetic regions are different.

For example, the anisotropic magnetic field of a magnetic region may be an average of the anisotropic magnetic fields in the first direction D1. The average of the anisotropic magnetic field of the first magnetic region 81 in the first direction D1 is defined as a first average anisotropic magnetic field Hk1. An average of the anisotropic magnetic field in the second magnetic region 82 in the first direction D1 is defined as a second average anisotropic magnetic field Hk2. An average of the anisotropic magnetic field in the third magnetic region 83 in the first direction D1 is defined as a third average anisotropic magnetic field Hk3.

In the embodiment, the anisotropic magnetic field of the first magnetic region 81 is larger than the anisotropic magnetic field of the second magnetic region 82. The anisotropic magnetic field of the third magnetic region 83 is larger than the anisotropic magnetic field of the second magnetic region 82. For example, in the embodiment, the first average anisotropic field Hk1 is larger than the second average anisotropic field Hk2. The third average anisotropic magnetic field Hk3 is larger than the second average anisotropic magnetic field Hk2. Thereby, a high areal recording density can be obtained.

Examples of simulation results on the magnetic recording medium 80 will be described below. In the simulation, the anisotropic magnetic fields (the first average anisotropic magnetic field Hk1, the second average anisotropic magnetic field Hk2, and the third average anisotropic magnetic field Hk3) of the magnetic region are changed. The anisotropic magnetic fields reflect the above composition ratios. In the simulation, the first exchange coupling strength Jex1 and the second exchange coupling strength Jex2 are further changed. The exchange coupling strength is related to the above distance. If the distance is long, the exchange coupling strength is low.

FIGS. 2A to 2C, 3A to 3C, 4A to 4C, and 5 are graphs illustrating the characteristics of the magnetic recording medium.

These figures exemplify the relationship between the areal recording density at which recording/reproducing operations can be properly performed when the anisotropic magnetic field and the exchange coupling strength are variously changed.

Figure 2A:
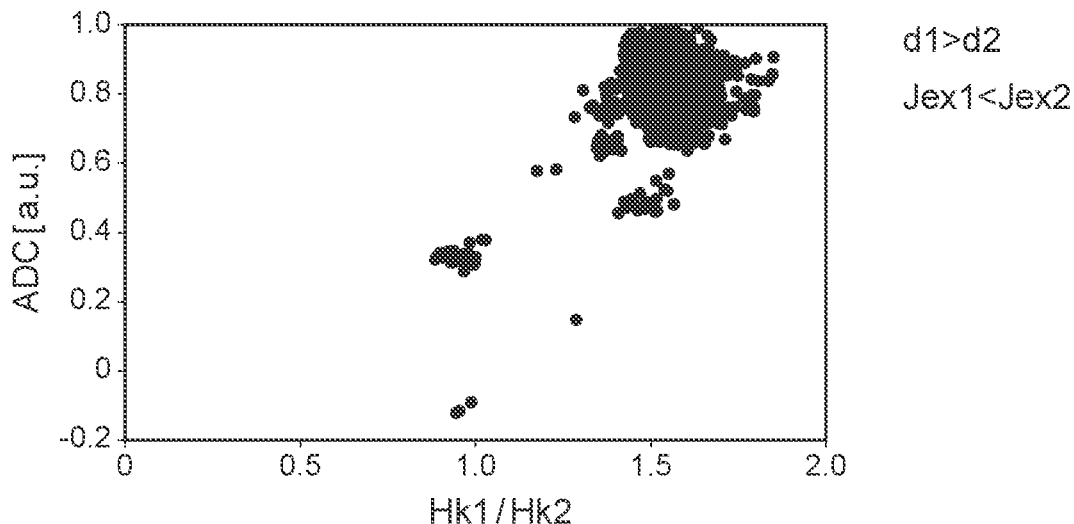
FIGS. 2A to 2C are graphs illustrating the characteristics of the magnetic recording medium.
Figure 2B:
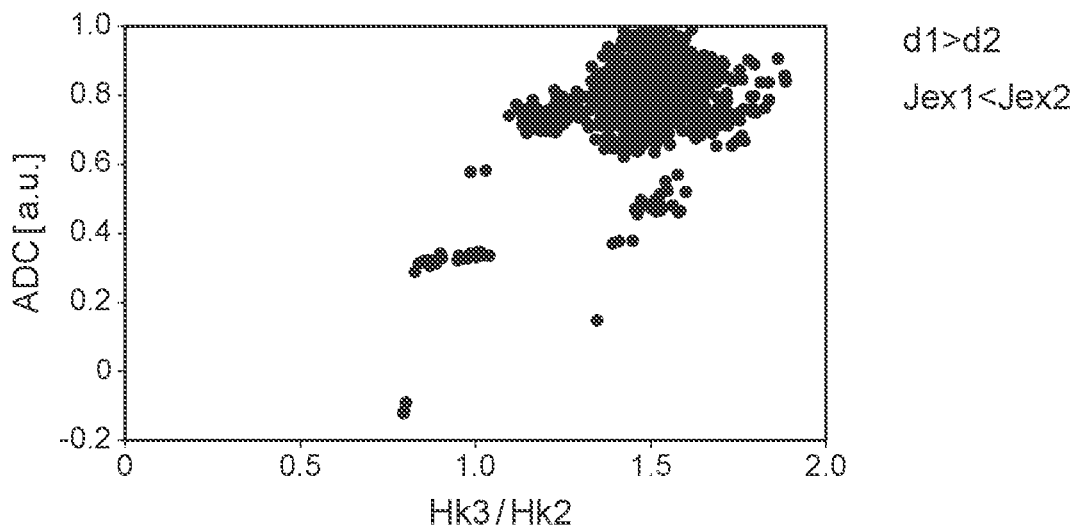
Figure 2C:
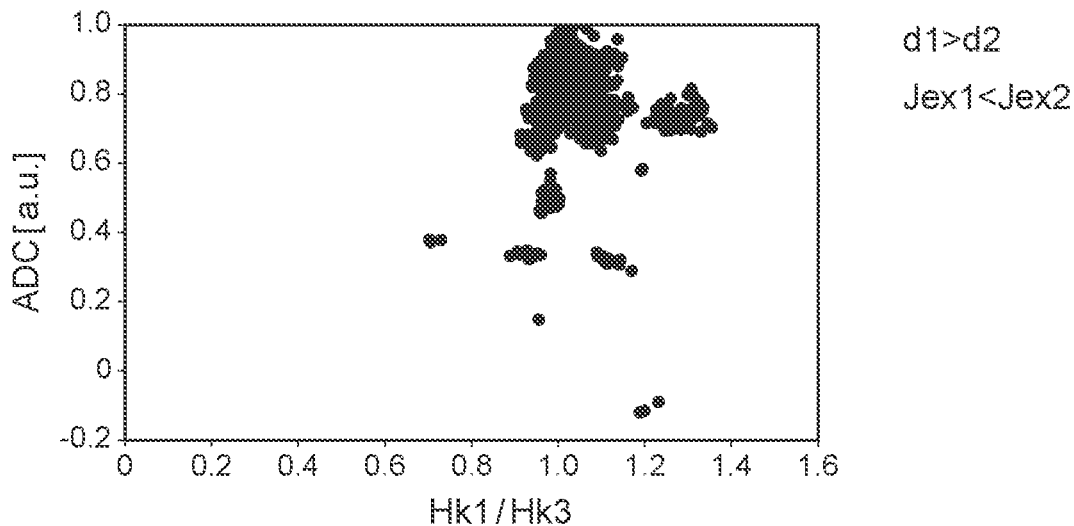

In FIGS. 2A to 2C, the first exchange coupling strength Jex1 is lower than the second exchange coupling strength Jex2. In this example, the first exchange coupling strength Jex1 is not less than 0.1 times and not more than 0.6 times the second exchange coupling strength Jex2. FIGS. 2A to 2C correspond to the case where the first distance d1 is longer than the second distance d2. The horizontal axis of FIG. 2A is Hk1/Hk2. The horizontal axis of FIG. 2B is Hk3/Hk2. The horizontal axis of FIG. 2C is Hk1/Hk3. The vertical axis of these figures is the areal recording density ADC.

Figure 3A:
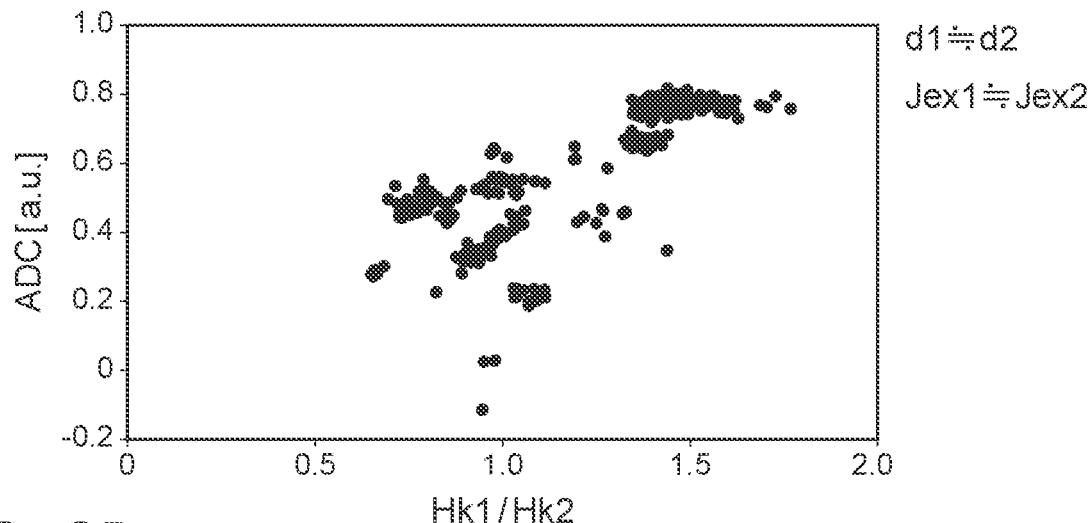
FIGS. 3A to 3C are graphs illustrating the characteristics of the magnetic recording medium.
Figure 3B:
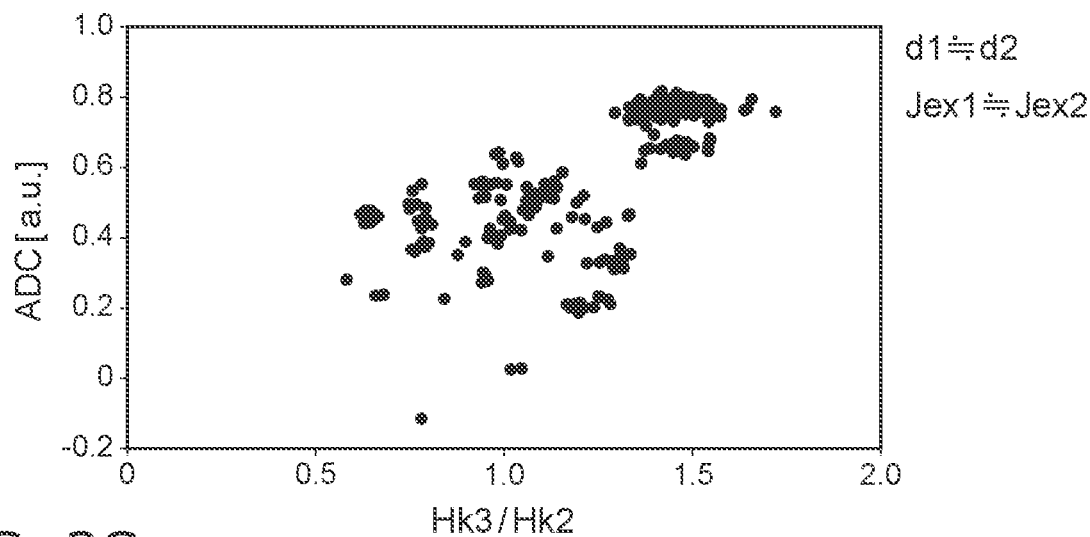
Figure 3C:
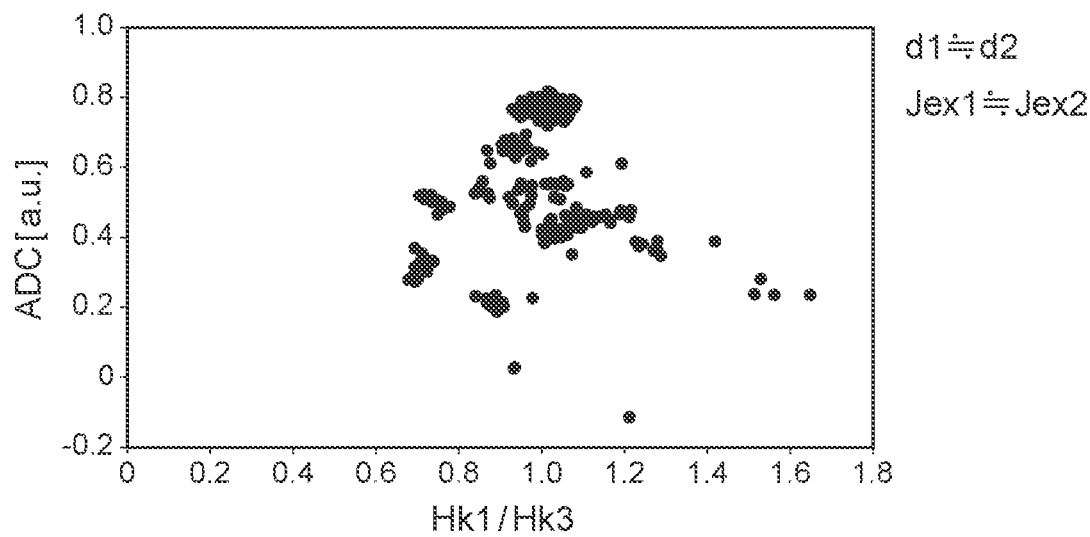

In FIGS. 3A to 3C, the first exchange coupling strength Jex1 is substantially the same as the second exchange coupling strength Jex2. In this example, the first exchange coupling strength Jex1 is not less than 0.9 times and not more than 1.1 times the second exchange coupling strength Jex2. FIGS. 3A to 3C correspond to the case where the first distance d1 is substantially the same as the second distance d2. The horizontal axis of FIG. 3A is Hk1/Hk2. The horizontal axis of FIG. 3B is Hk3/Hk2. The horizontal axis of FIG. 3C is Hk1/Hk3. The vertical axis of these figures is the areal recording density ADC.

Figure 4A:
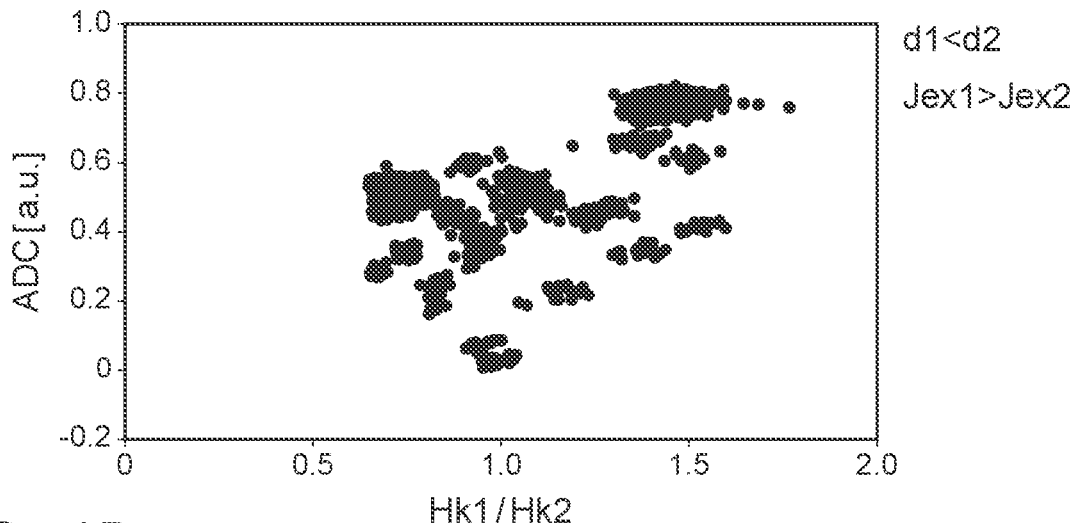
FIGS. 4A to 4C are graphs illustrating the characteristics of the magnetic recording medium.
Figure 4B:
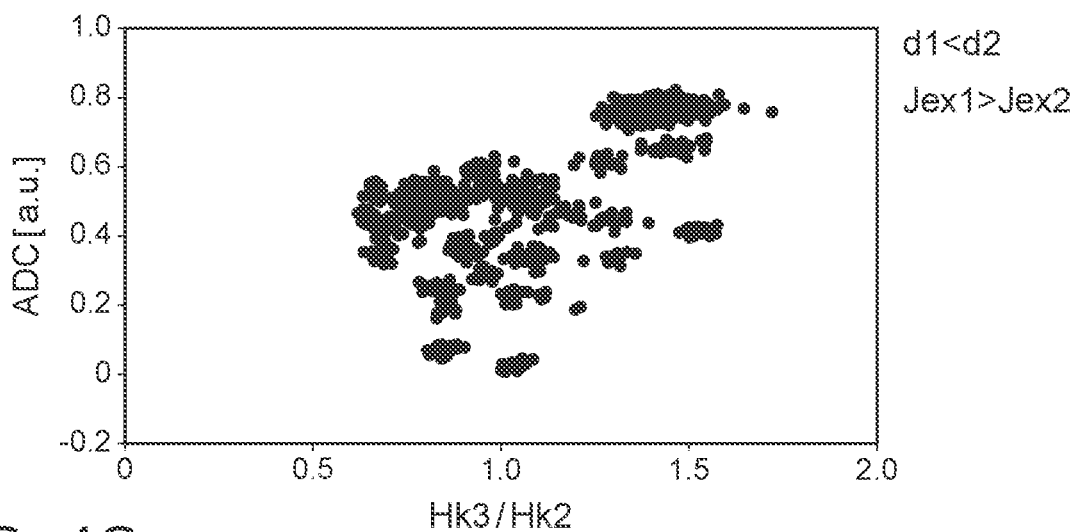
Figure 4C:
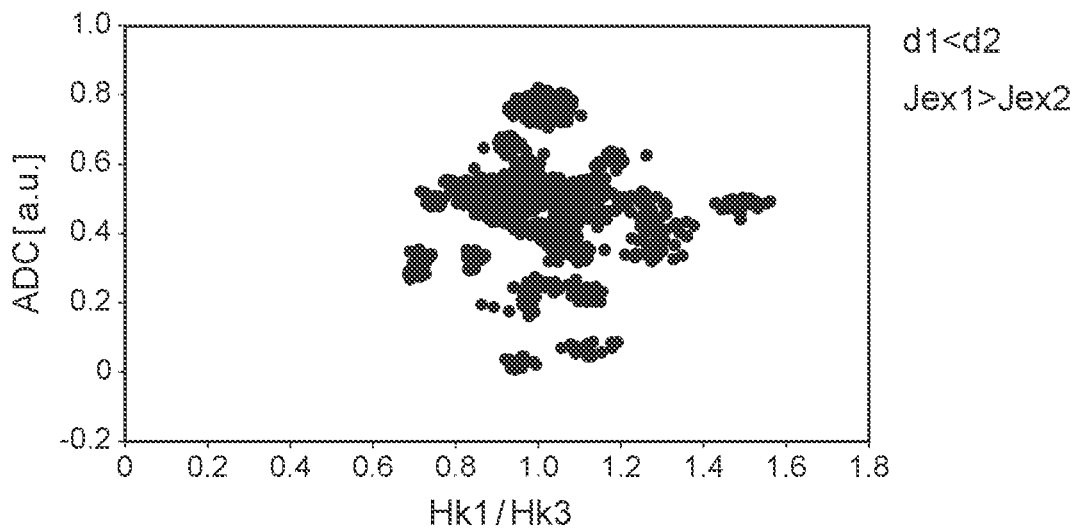

In FIGS. 4A to 4C, the first exchange coupling strength Jex1 is higher than the second exchange coupling strength Jex2. In this example, the first exchange coupling strength Jex1 is not less than 1 times and not more than 20 times the second exchange coupling strength Jex2. FIGS. 4A to 4C correspond to the case where the first distance d1 is shorter than the second distance d2. The horizontal axis of FIG. 4A is Hk1/Hk2. The horizontal axis of FIG. 4B is Hk3/Hk2. The horizontal axis of FIG. 4C is Hk1/Hk3. The vertical axis of these figures is the areal recording density ADC.

As shown in FIGS. 2A to 2C, in the case where the first exchange coupling strength Jex1 is lower than the second exchange coupling strength Jex2, there exists a condition that the areal recording density ADC being high of 0.9 to 1.0 can be obtained. On the other hand, as shown in FIGS. 3A to 3C, in the case where the first exchange coupling strength Jex1 is substantially the same as the second exchange coupling strength Jex2, the areal recording density ADC is 0.8 or less. As shown in FIGS. 4A to 4 C, in the case where the first exchange coupling strength Jex1 is higher than the second exchange coupling strength Jex2, the areal recording density ADC is 0.8 or less.

Thus, by the first exchange coupling strength Jex1 being lower than the second exchange coupling strength Jex2, so a high areal density can be obtained. For example, the first exchange coupling strength Jex1 is not less than 0.1 times and not more than 0.6 times the second exchange coupling strength Jex2. High areal density is obtained.

For example, the distance between the first magnetic region 81 and the magnetic head 110 is shorter than the distance between the second magnetic region 82 and the magnetic head 110, and is shorter than the distance between the third magnetic region 83 and the magnetic head 110. In the recording operation by the magnetic head 110, the magnetization of the first magnetic region 81 is more easily reversed than the magnetization of other magnetic regions. The magnetization of the first magnetic region 81 being reversed is transmitted to the second magnetic region 82 by the low first exchange coupling strength Jex1. For example, the magnetization of the second magnetic region 82 having the second average anisotropic magnetic field Hk2 being small is effectively reversed by the influence of the magnetization of the first magnetic region 81 having the first average anisotropic magnetic field Hk1 being high. On the other hand, by the second exchange coupling strength Jex2 being high, the magnetization of the second magnetic region 82 having the second average anisotropic magnetic field Hk2 being small can be transmitted to the third magnetic region 83. For example, even in the case also where the third average anisotropic magnetic field Hk3 of the third magnetic region 83 is high, the magnetization of the second magnetic region 82 is transmitted to the third magnetic region 83 by the second exchange coupling strength Jex2 being high. This is considered to provide the high areal density.

As shown in FIG. 2A, the areal recording density ADC being high is obtained when Hk1/Hk2 is not less than 1.4 and not more than 1.7. As shown in FIG. 2B, the areal recording density ADC being high is obtained when Hk3/Hk2 is not less than 1.4 and not more than 1.7. As shown in FIG. 2C), the areal recording density ADC being high is obtained when Hk1/Hk3 is not less than 0.9 and not more than 1.1.

Figure 5:
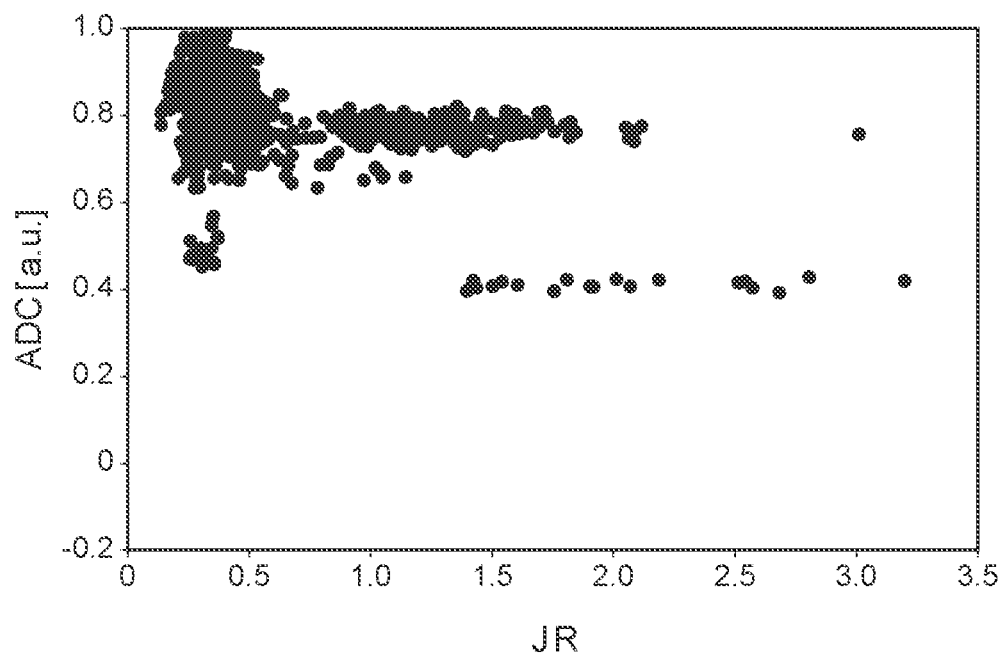
FIG. 5 is a graph illustrating the characteristics of the magnetic recording medium.

The horizontal axis of FIG. 5 is an exchange coupling ratio JR. The exchange coupling ratio JR is a ratio of the first exchange coupling strength Jex1 to the second exchange coupling strength Jex2. In FIG. 5, Hk1>Hk2 and Hk3>Hk2. As shown in FIG. 5, the areal recording density being high is obtained when the exchange coupling ratio JR is not less than 0.1 and not more than 0.6.

In the embodiment, for example, the ratio of the first exchange coupling strength to the second exchange coupling strength is preferably not less than 0.1 and not more than 0.6. Thereby, a high areal recording density can be obtained.

In the embodiment, the ratio of the anisotropic magnetic field of the first magnetic region 81 to the anisotropic magnetic field of the second magnetic region 82 is preferably not less than 1.4 and not more than 1.7. For example, the ratio (Hk1/Hk2) of the first average anisotropic magnetic field Hk1 to the second average anisotropic magnetic field Hk2 is preferably not less than 1.4 and not more than 1.7. Thereby, a high areal recording density can be obtained. The ratio of the anisotropic magnetic field of the third magnetic region 83 to the anisotropic magnetic field of the second magnetic region 82 is preferably not less than 1.4 and not more than 1.7. For example, the ratio (Hk3/Hk2) of the third average anisotropic magnetic field Hk3 to the second average anisotropic magnetic field Hk2 is preferably not less than 1.4 and not more than 1.7. Thereby, a high areal recording density can be obtained. The ratio of the anisotropic magnetic field of the first magnetic region 81 to the anisotropic magnetic field of the third magnetic region 83 is preferably not less than 0.9 and not more than 1.1. For example, the ratio (Hk1/Hk3) of the first average anisotropic magnetic field Hk1 to the third average anisotropic magnetic field Hk3 is preferably not less than 0.9 and not more than 1.1. Thereby, a high areal recording density can be obtained.

In the embodiment, the first average anisotropic magnetic field Hk1 is preferably 19000 Oe or more, for example. The first average anisotropic magnetic field Hk1 may be 25000 Oe or less. The second average anisotropic magnetic field Hk2 is preferably, for example, not less than 11000 Oe and not more than 15000 Oe. The third average anisotropic magnetic field Hk3 is preferably, for example, 18000 Oe or more. The third average anisotropic magnetic field Hk3 may be 25000 Oe or less.

Thus, in the magnetic recording medium 80 according to the embodiment, the first magnetic region 81, the second magnetic region 82, and the third magnetic region 83 may satisfy the following conditions.

The anisotropic magnetic field of the first magnetic region 81 is larger than the anisotropic magnetic field of the second magnetic region 82. The anisotropic magnetic field of the third magnetic region 83 is larger than the anisotropic magnetic field of the second magnetic region 82. For example, the average of the anisotropic magnetic field in the first magnetic region 81 in the first direction D1 is the first average anisotropic magnetic field Hk1. For example, the first ratio of the first difference between the highest value and the minimum value of the anisotropic magnetic field in the first magnetic region 81 to the first average anisotropic magnetic field Hk1 is 0.2 or less. The average of the anisotropic magnetic field in the second magnetic region 82 in the first direction D1 is the second average anisotropic magnetic field Hk2. For example, the second ratio of the second difference between the highest value and the minimum value of the anisotropic magnetic field in the second magnetic region 82 to the second average anisotropic magnetic field Hk2 is 0.2 or less. The average of the anisotropic magnetic field in the third magnetic region 83 in the first direction D1 is the third average anisotropic magnetic field Hk3. For example, the third ratio of the third difference between the highest value and the minimum value of the anisotropic magnetic field in the third magnetic region 83 to the third average anisotropic magnetic field Hk3 is 0.2 or less.

The first average anisotropic magnetic field Hk1 is larger than the second average anisotropic magnetic field Hk2. The third average anisotropic magnetic field Hk3 is larger than the second average anisotropic magnetic field Hk2. The first distance d1 along the first direction D1 between the second magnetic region 82 and the first magnetic region 81 is longer than the second distance d2 along the first direction D1 between the third magnetic region 83 and the second magnetic region 82. Alternatively, the first magnetic region 81 is separated from the second magnetic region 82, and the third magnetic region 83 is in contact with the second magnetic region 82.

A first thickness t1 (see FIG. 1) of the first magnetic region 81 is, for example, not less than 4 nm and not more than 10 nm. A second thickness t2 (see FIG. 1) of the second magnetic region 82 is, for example, not less than 1 nm and not more than 6 nm. A third thickness t3 (see FIG. 1) of the third magnetic region 83 is, for example, not less than 4 nm and not more than 10 nm. These thicknesses are lengths along the first direction D1.

The first distance d1 is, for example, not less than 0.1 nm and not more than 0.6 nm. The second distance d2 is, for example, not less than 0 nm and not more than 0.5 nm.

Figure 6:
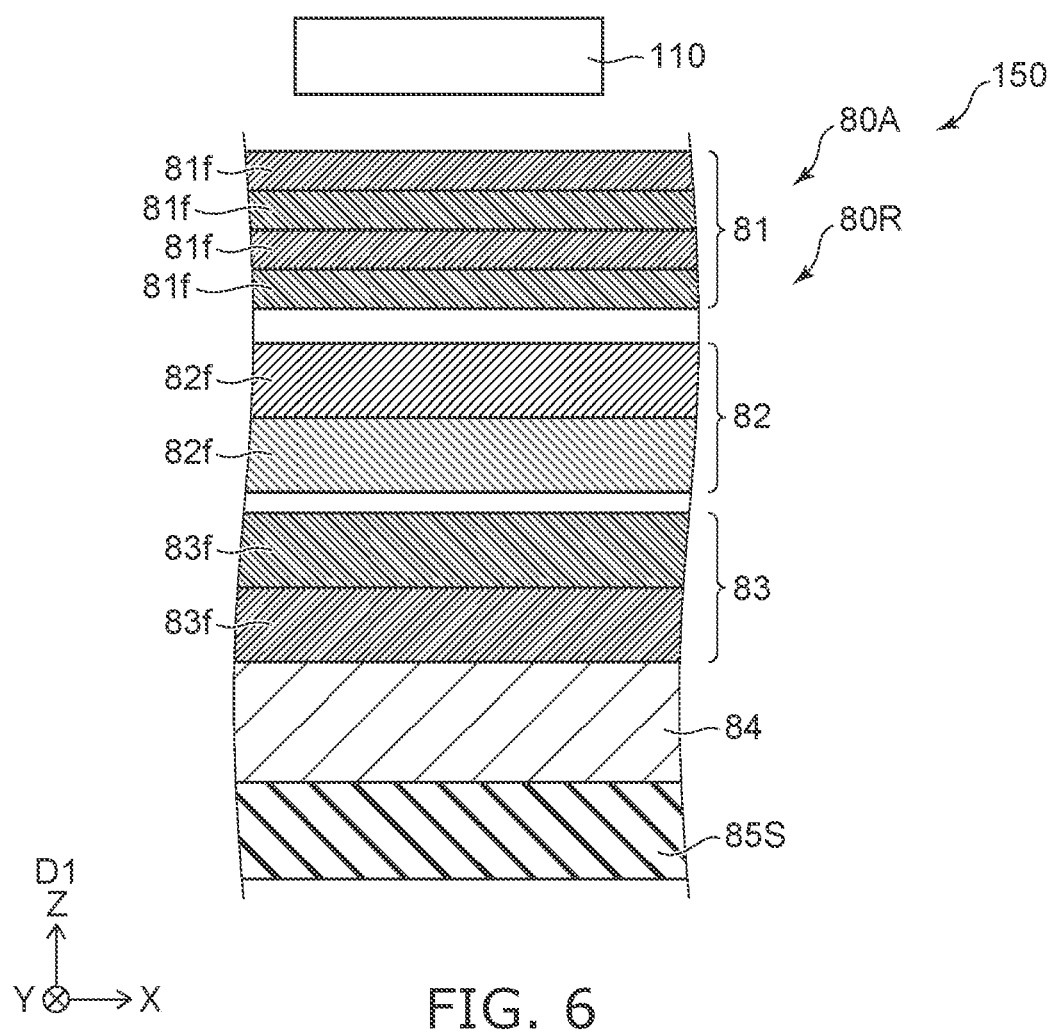
FIG. 6 is a schematic cross-sectional view illustrating the magnetic recording medium according to the first embodiment.

FIG. 6 is a schematic cross-sectional view illustrating the magnetic recording medium according to the first embodiment.

As shown in FIG. 6, in a magnetic recording medium 80A according to the embodiment, at least one of the three magnetic regions includes multiple magnetic films. Except for this, the configuration of the magnetic recording medium 80A may be the same as that of the magnetic recording medium 80.

As shown in FIG. 6, the first magnetic region 81 includes a plurality of first magnetic films 81f. The plurality of first magnetic films 81f are arranged along the first direction D1. A direction from one of the plurality of first magnetic films 81f to another one of the plurality of first magnetic films 81f is along the first direction D1.

The second magnetic region 82 includes a plurality of second magnetic films 82f. A direction from one of the plurality of second magnetic films 82f to another one of the plurality of second magnetic films 82f is along the first direction D1. The third magnetic region 83 includes a plurality of third magnetic films 83f. A direction from one of the plurality of third magnetic films 83f to another one of the plurality of third magnetic films 83f is along the first direction D1.

The difference in composition ratio among the plurality of first magnetic films 81f is, for example, within 20%. The difference in composition ratio among the plurality of second magnetic films 82f is, for example, within 20%. The difference in composition ratio among the plurality of third magnetic films 83f is, for example, within 20%.

Figure 7:
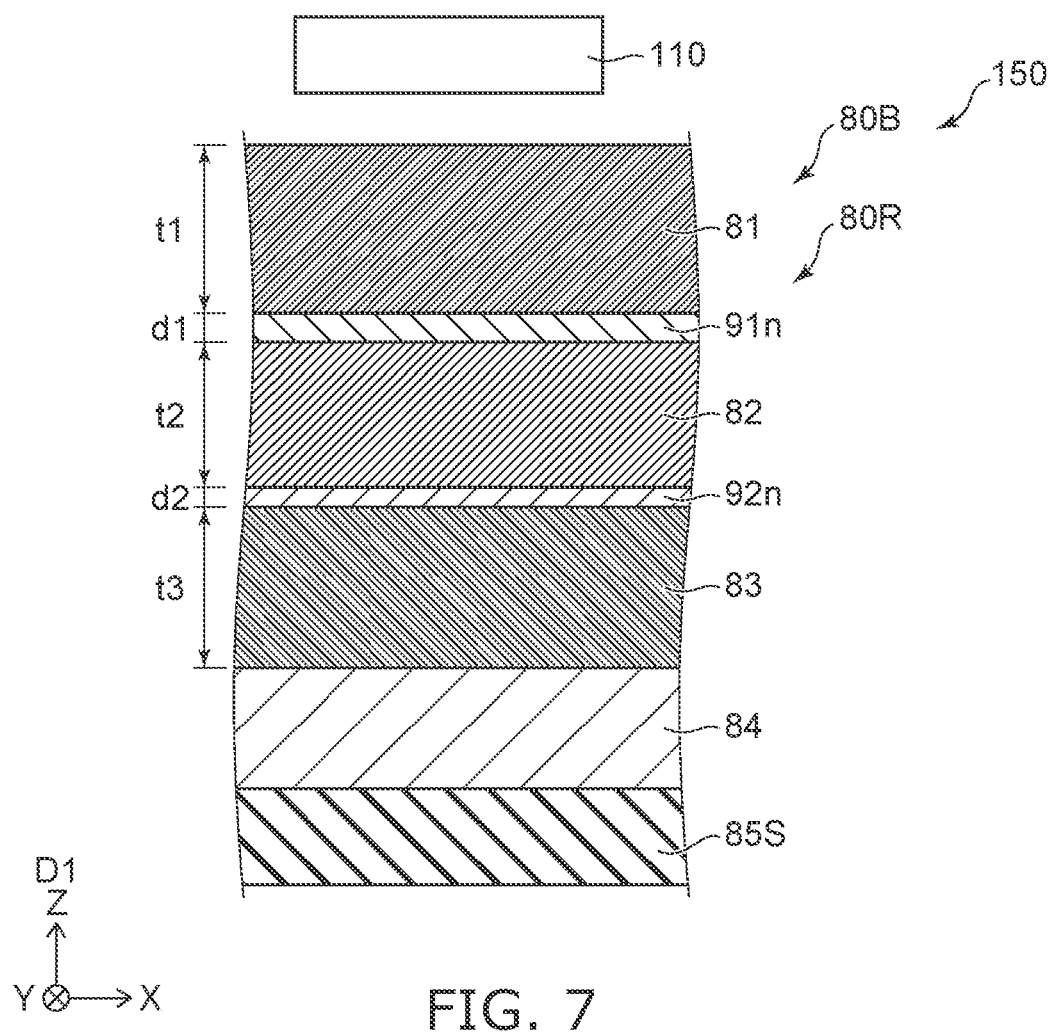
FIG. 7 is a schematic cross-sectional view illustrating the magnetic recording medium according to the first embodiment.

FIG. 7 is a schematic cross-sectional view illustrating the magnetic recording medium according to the first embodiment.

As shown in FIG. 7, a magnetic recording medium 80B according to the embodiment further includes a first intermediate region 91n and a second intermediate region 92n. Except for this, the configuration of the magnetic recording medium 80B may be the same as the configuration of the magnetic recording medium 80 or the magnetic recording medium 80A.

The first intermediate region 91n is provided between the second magnetic region 82 and the first magnetic region 81 in the magnetic recording medium 80B. The first intermediate region 91n is non-magnetic. The second intermediate region 92n is provided between the third magnetic region 83 and the second magnetic region 82. The second intermediate region 92n is non-magnetic.

The first intermediate region 91n and the second intermediate region 92n include at least one selected from the group consisting of Ru, Pt and C, for example. The thickness of the first intermediate region 91n corresponds to the first distance d1. The thickness of the second intermediate region 92n corresponds to the second distance d2.

Figure 8:
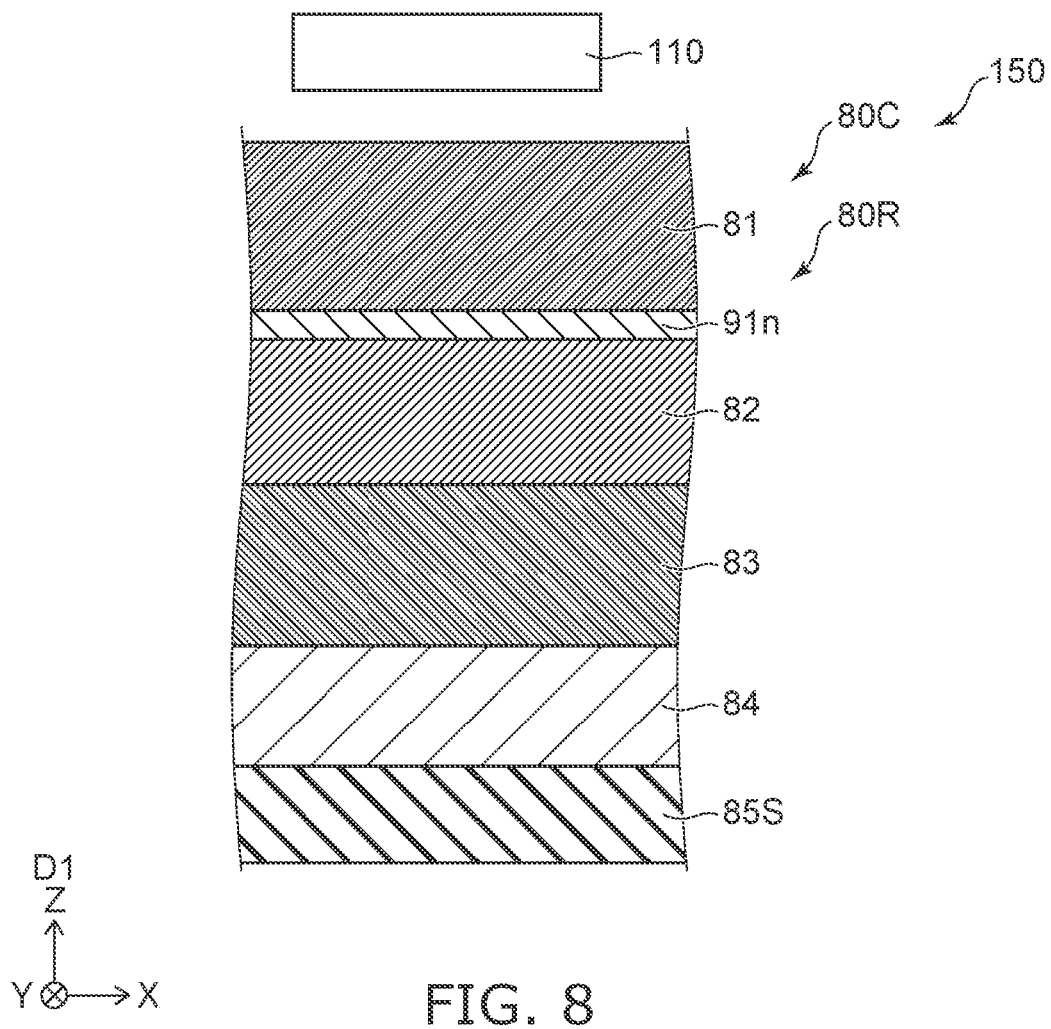
FIG. 8 is a schematic cross-sectional view illustrating the magnetic recording medium according to the first embodiment.

FIG. 8 is a schematic cross-sectional view illustrating the magnetic recording medium according to the first embodiment.

As shown in FIG. 8, a magnetic recording medium 80C according to the embodiment includes the first intermediate region 91n. In the magnetic recording medium 80C, the second magnetic region 82 are in contact with the third magnetic region 83. Except for this, the configuration of the magnetic recording medium 80C may be the same as the configuration of the magnetic recording medium 80 or the magnetic recording medium 80A.

The second distance d2 is zero in the magnetic recording medium 80C. The contact of the second magnetic region 82 with the third magnetic region 83 makes the first exchange coupling strength lower than the second exchange coupling strength.

Figure 9:
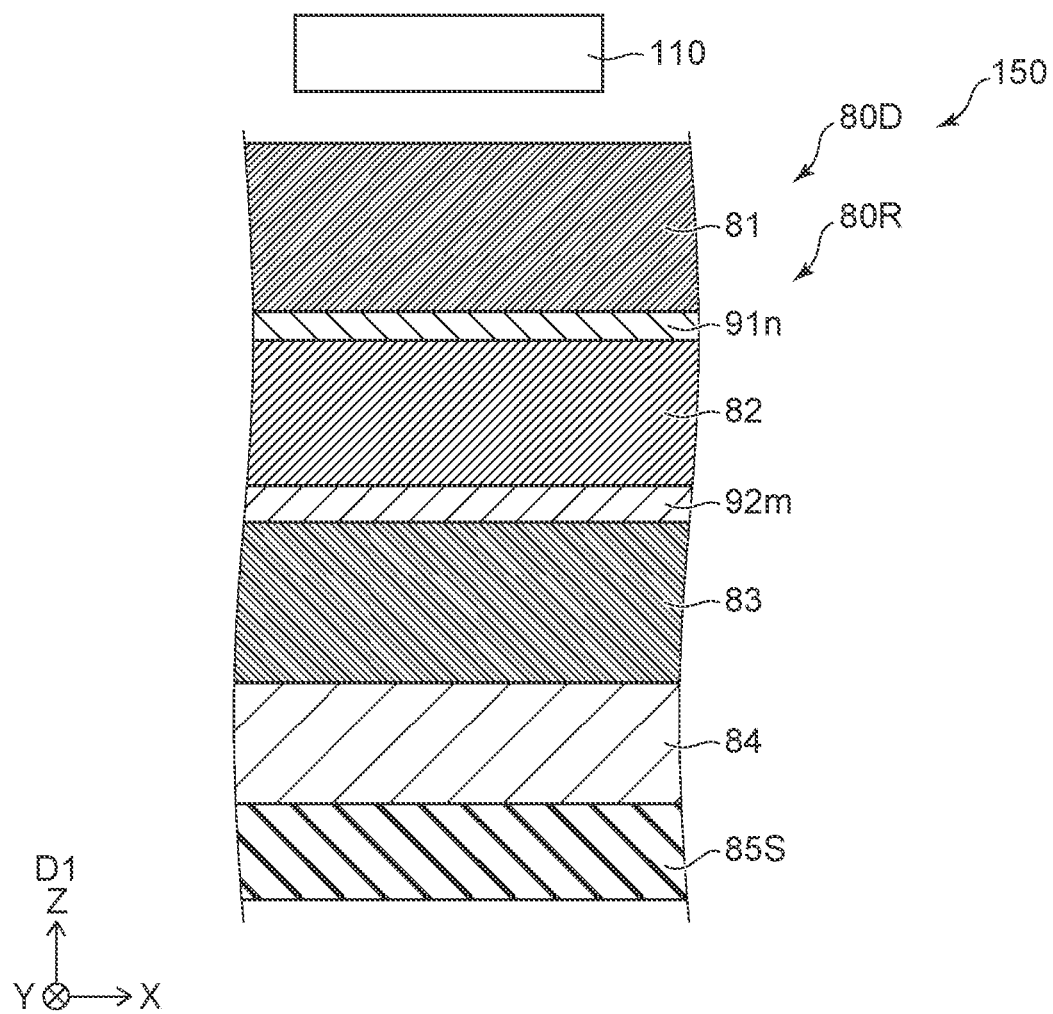
FIG. 9 is a schematic cross-sectional view illustrating the magnetic recording medium according to the first embodiment.

FIG. 9 is a schematic cross-sectional view illustrating the magnetic recording medium according to the first embodiment.

As shown in FIG. 9, a magnetic recording medium 80D according to the embodiment further includes the first intermediate region 91n and a second intermediate magnetic region 92m. Except for this, the configuration of the magnetic recording medium 80D may be the same as the configuration of the magnetic recording medium 80 or the magnetic recording medium 80A.

The first intermediate region 91n is provided between the second magnetic region 82 and the first magnetic region 81. The first intermediate region 91n is non-magnetic. The second intermediate magnetic region 92m is provided between the third magnetic region 83 and the second magnetic region 82. The second intermediate magnetic region 92m is a continuous magnetic region. The second intermediate magnetic region 92m includes Co and at least one selected from the group consisting of Cr, Pt and Pd, for example. The thickness of the first intermediate region 91n corresponds to the first distance d1. The thickness of the second intermediate magnetic region 92m corresponds to the second distance d2.

In the magnetic recording medium 80D, the first distance d1 may be the same as, shorter than, or longer than the second distance d2. A difference in exchange coupling strength is obtained due to the difference between the non-magnetic film and the magnetic film. In the magnetic recording medium 80D, the first exchange coupling strength is lower than the second exchange coupling strength.

In the magnetic recording medium 80D, the second magnetic region 82 and the third magnetic region 83 are granular magnetic regions. The second intermediate magnetic region 92m, the second magnetic region 82, and the third magnetic region 83 can be specified, for example, by an electron microscope image. The first magnetic region 81 may also be a granular magnetic region.

Thus, the magnetic recording medium 80D includes the first magnetic region 81, the second magnetic region 82, the third magnetic region 83, the first intermediate region 91n and the second intermediate magnetic region 92m. The first intermediate region 91n is provided between the second magnetic region 82 and the first magnetic region 81. The second intermediate magnetic region 92m is provided between the third magnetic region 83 and the second magnetic region 82. The second intermediate magnetic region 92m is a continuous magnetic region. The first intermediate region 91n is non-magnetic.

Figure 10:
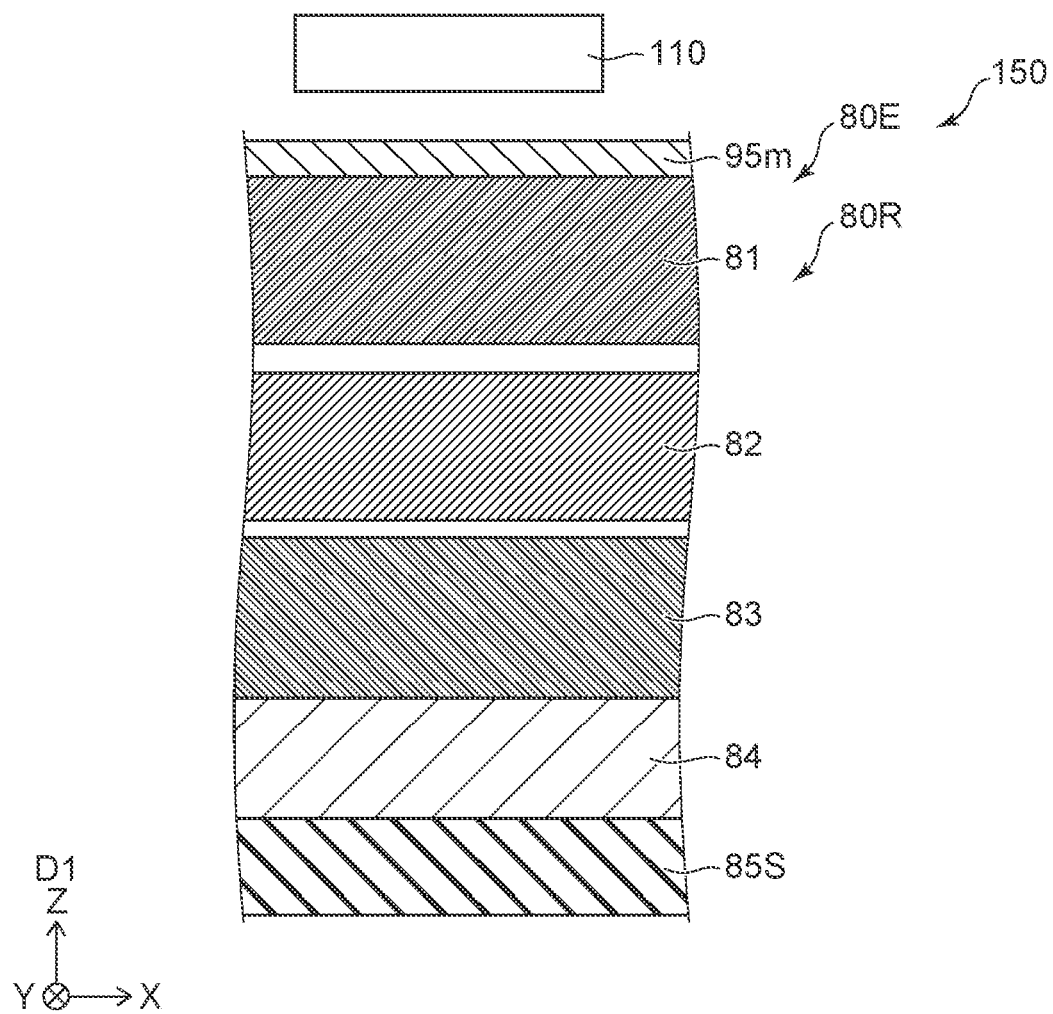
FIG. 10 is a schematic cross-sectional view illustrating the magnetic recording medium according to the first embodiment.

FIG. 10 is a schematic cross-sectional view illustrating the magnetic recording medium according to the first embodiment.

As shown in FIG. 10, a magnetic recording medium 80E according to the embodiment includes a first continuous magnetic region 95m. Except for this, the configuration of the magnetic recording medium 80E may be the same as the configuration of the magnetic recording medium 80 or the magnetic recording medium 80A.

In the magnetic recording medium 80E, the first magnetic region 81 is provided between the third magnetic region 83 and the first continuous magnetic region 95m. The first continuous magnetic region 95m includes Co and at least one selected from the group consisting of Cr, Pt and Pd, for example. The first continuous magnetic region 95m is, for example, a cap layer. By providing the first continuous magnetic region 95m, for example, high recording characteristics can be obtained.

In the magnetic recording medium 80E, the first magnetic region 81 is a granular magnetic region. The second magnetic region 82 and the third magnetic region 83 may also be granular magnetic regions.

Figure 11:
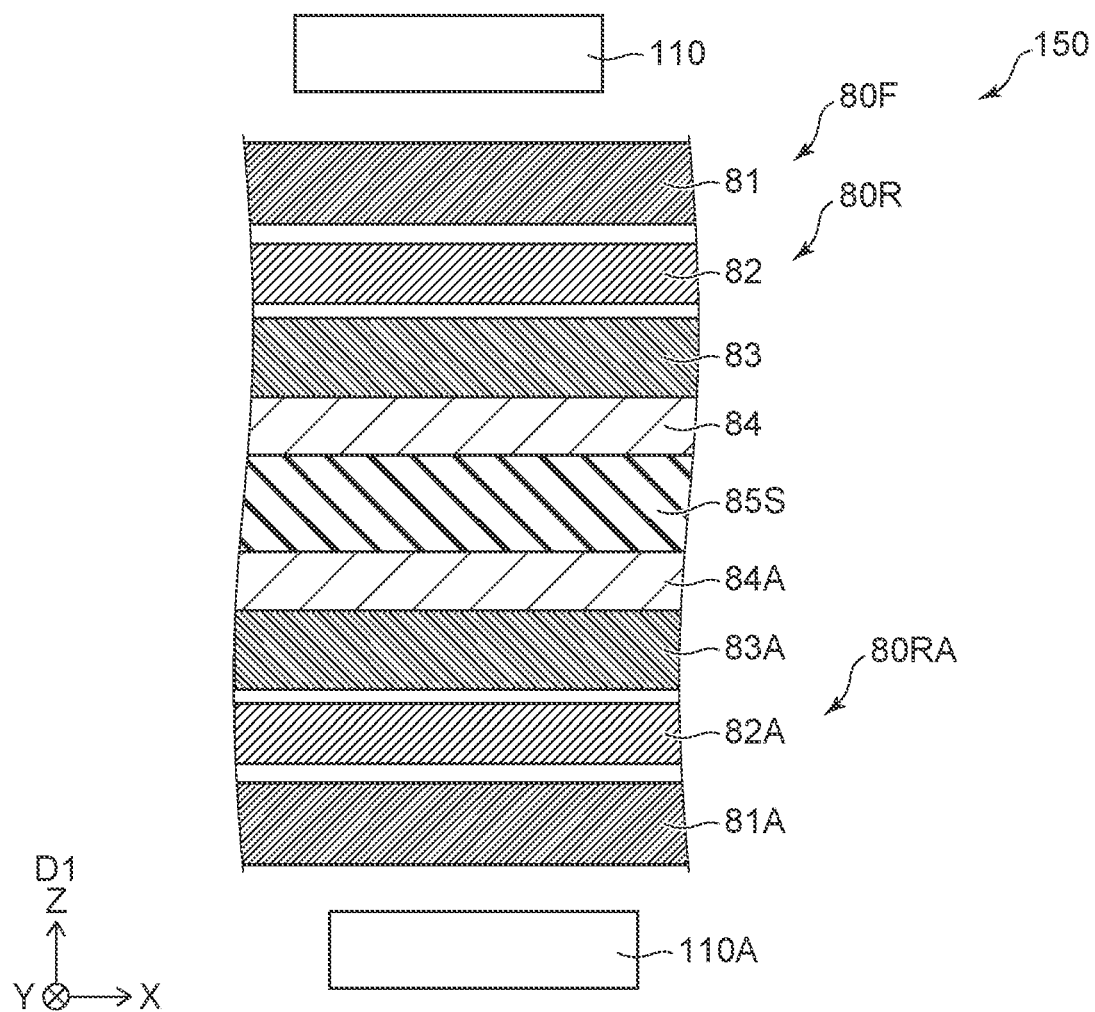
FIG. 11 is a schematic cross-sectional view illustrating the magnetic recording medium according to the first embodiment.

FIG. 11 is a schematic cross-sectional view illustrating the magnetic recording medium according to the first embodiment.

As shown in FIG. 11, in a magnetic recording medium 80F according to the embodiment, another recording layer 80RA is provided in addition to the recording layer 80R. Except for this, the configuration of the magnetic recording medium 80F may be the same as the configuration of any magnetic recording medium described above.

The non-magnetic substrate 85S is provided between another recording layer 80RA and the recording layer 80R. The other recording layer 80RA includes another first magnetic region 81A, another second magnetic region 82A, and another third magnetic region 83A. The non-magnetic substrate 85S is provided between the other first magnetic region 81A and the first magnetic region 81. The other second magnetic region 82A is provided between the other first magnetic region 81A and the non-magnetic substrate 85S. The other third magnetic region 83A is provided between the other second magnetic region 82A and the non-magnetic substrate 85S. Another intermediate layer 84A may be provided between the other third magnetic region 83A and the non-magnetic substrate 85S.

In the magnetic recording medium 80F, the recording layer is provided on each of the two faces of the non-magnetic substrate 85S. Another magnetic head 110A faces the other first magnetic region 81A.

Second Embodiment

The second embodiment relates to a magnetic recording device 150.

Figure 12:
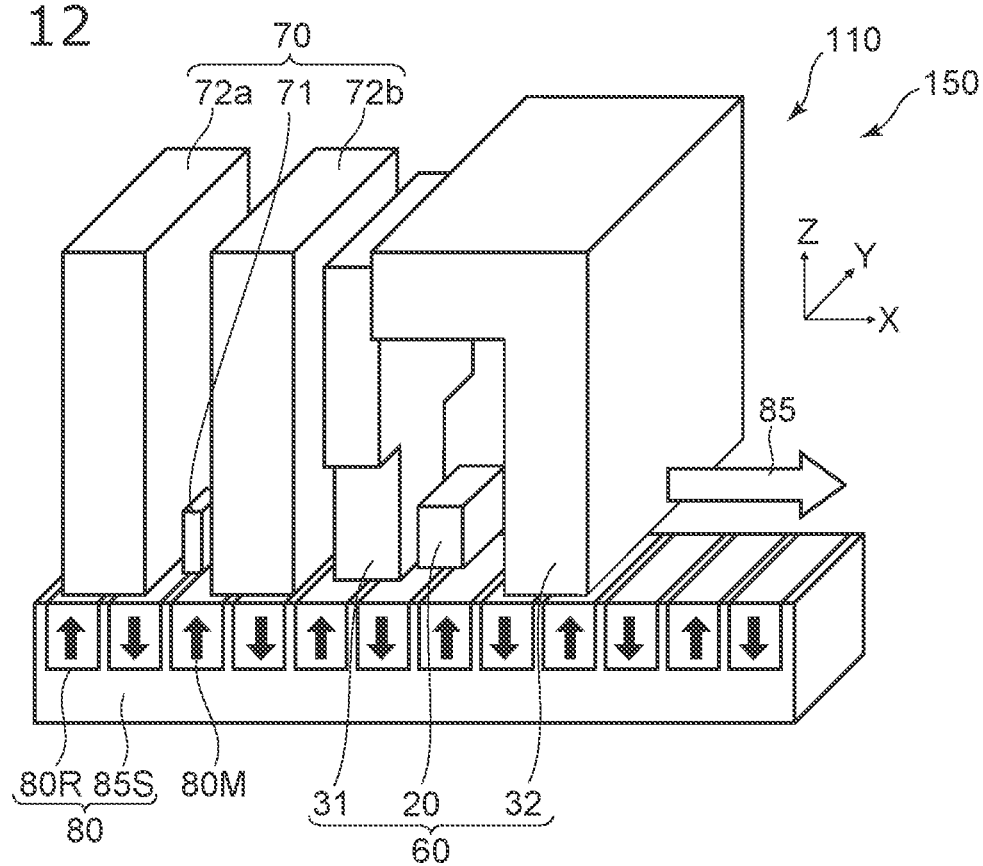
FIG. 12 is a schematic perspective view illustrating a magnetic recording device according to a second embodiment.

FIG. 12 is a schematic perspective view illustrating a magnetic recording device according to a second embodiment.

As shown in FIG. 12, the magnetic head 110 is used together with the magnetic recording medium (such as the magnetic recording medium 80) according to the first embodiment. In this example, the magnetic head 110 includes a recording section 60 and a reproducing section 70. Information is recorded on the magnetic recording medium 80 by the recording section 60 of the magnetic head 110. Information recorded on the magnetic recording medium 80 is reproduced by the reproducing section 70.

The magnetic recording medium 80 includes, for example, the non-magnetic substrate 85S and the recording layer 80R provided on the non-magnetic substrate 85S. The magnetization 80M of the recording layer 80R is controlled by the recording section 60.

The reproducing section 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is configured to output a signal corresponding to the magnetization 80M of the recording layer 80R.

As shown in FIG. 12, the magnetic recording medium 80 moves relative to the magnetic head 110 in the medium moving direction 85. The magnetic head 110 controls information corresponding to the magnetization 80M of the recording layer 80R at an arbitrary position. The magnetic head 110 reproduces information corresponding to the magnetization 80M of the recording layer 80R at an arbitrary position.

As already explained, in the magnetic recording device 150, the first magnetic region 81 is positioned between the third magnetic region 83 and the magnetic head 110 (see FIG. 1). The magnetic head 110 is configured to perform a recording operation. In the recording operation, an alternating magnetic field is applied from the magnetic head 110 to the magnetic recording medium 80 (the recording layer 80R). The recording magnetic field is applied from the magnetic head 110 to the magnetic recording medium 80 (recording layer 80R).

Figure 13:
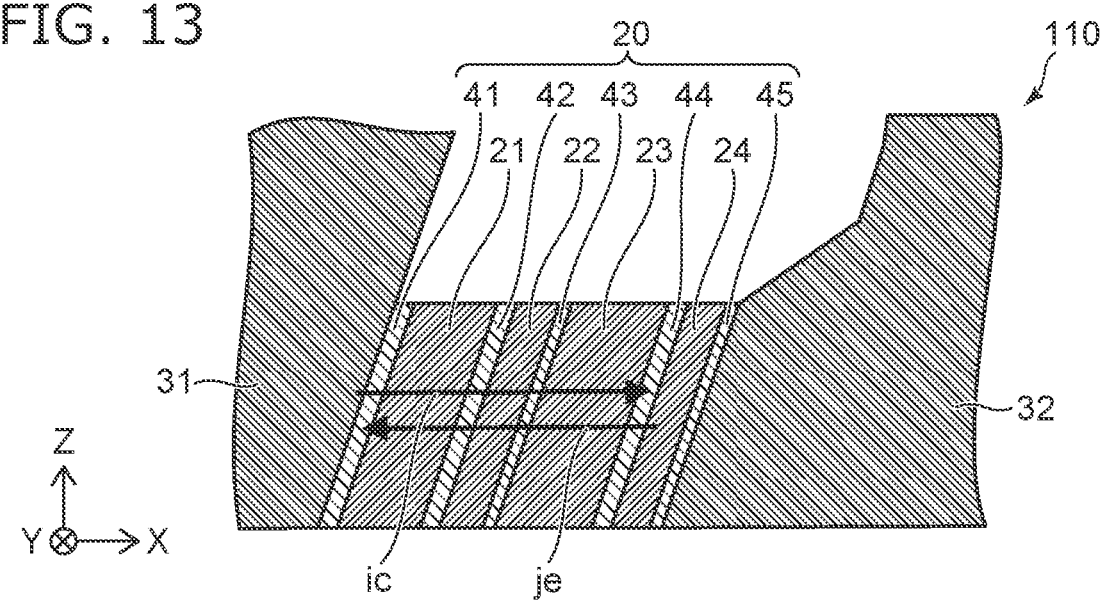
FIG. 13 is a schematic cross-sectional view illustrating a part of the magnetic recording device according to the second embodiment.

FIG. 13 is a schematic cross-sectional view illustrating a part of the magnetic recording device according to the second embodiment.

FIG. 13 illustrates the magnetic head 110. The magnetic head 110 includes a first magnetic pole 31, a second magnetic pole 32 and a magnetic element 20. The magnetic element 20 is provided between the first magnetic pole 31 and the second magnetic pole 32.

For example, the magnetic element 20 includes a first magnetic layer 21, a second magnetic layer 22, a third magnetic layer 23 and a fourth magnetic layer 24. The first magnetic layer 21 is provided between the first magnetic pole 31 and the second magnetic pole 32. The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the second magnetic pole 32.

For example, the magnetic element 20 includes a first non-magnetic layer 41, a second non-magnetic layer 42, a third non-magnetic layer 43, a fourth non-magnetic layer 44 and a fifth non-magnetic layer 45. The first non-magnetic layer 41 is provided between the first magnetic pole 31 and the first magnetic layer 21. The second non-magnetic layer 42 is provided between the first magnetic layer 21 and the second magnetic layer 22. The third non-magnetic layer 43 is provided between the second magnetic layer 22 and the third magnetic layer 23. The fourth non-magnetic layer 44 is provided between the third magnetic layer 23 and the fourth magnetic layer 24. The fifth non-magnetic layer 45 is provided between the fourth magnetic layer 24 and the second magnetic pole 32.

In one example, the first non-magnetic layer 41 includes at least one selected from the group consisting of Cu, Au, Cr, V, Al and Ag. The second non-magnetic layer 42 includes at least one selected from the group consisting of Ru, Ir, Ta, Rh, Pd, Pt and W. The third non-magnetic layer 43 includes at least one selected from the group consisting of Cu, Au, Cr, V, Al and Ag. The fourth non-magnetic layer 44 includes at least one selected from the group consisting of Cu, Au, Cr, V, Al and Ag. The fifth non-magnetic layer 45 includes at least one selected from the group consisting of Ru, Ir, Ta, Rh, Pd, Pt and W. In such a configuration, for example, it becomes easy to obtain a stable alternating magnetic field.

As shown in FIG. 13, a current ic is supplied to the magnetic element 20 in the recording operation. The current ic flows from the first magnetic pole 31 to the second magnetic pole 32. Electron current je flows from the second magnetic pole 32 to the first magnetic pole 31.

Figure 14:
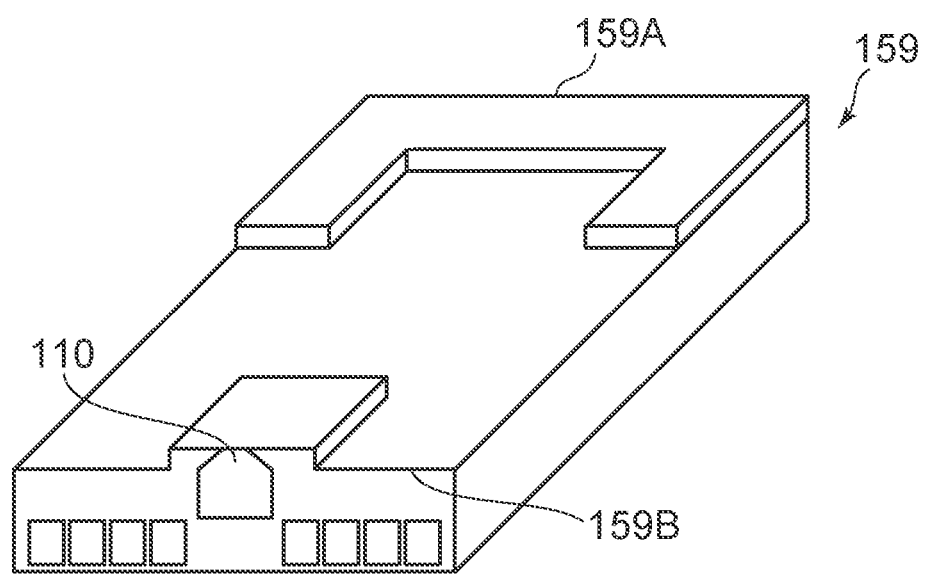
FIG. 14 is a schematic perspective view illustrating a part of the magnetic recording device according to the embodiment.

FIG. 14 is a schematic perspective view illustrating a part of the magnetic recording device according to the embodiment.

FIG. 14 illustrates a head slider.

The magnetic head 110 is provided on the head slider 159. The head slider 159 includes, for example, $Al_2O_3$/TIC. The head slider 159 moves relative to the magnetic recording medium while floating or in contact with the magnetic recording medium.

The head slider 159 includes, for example, an air inflow side 159A and an air outflow side 159B. The magnetic head 110 is provided on the side face of the air outflow side 159B of the head slider 159 or the like. As a result, the magnetic head 110 moves relative to the magnetic recording medium while flying above or in contact with the magnetic recording medium.

Figure 15:
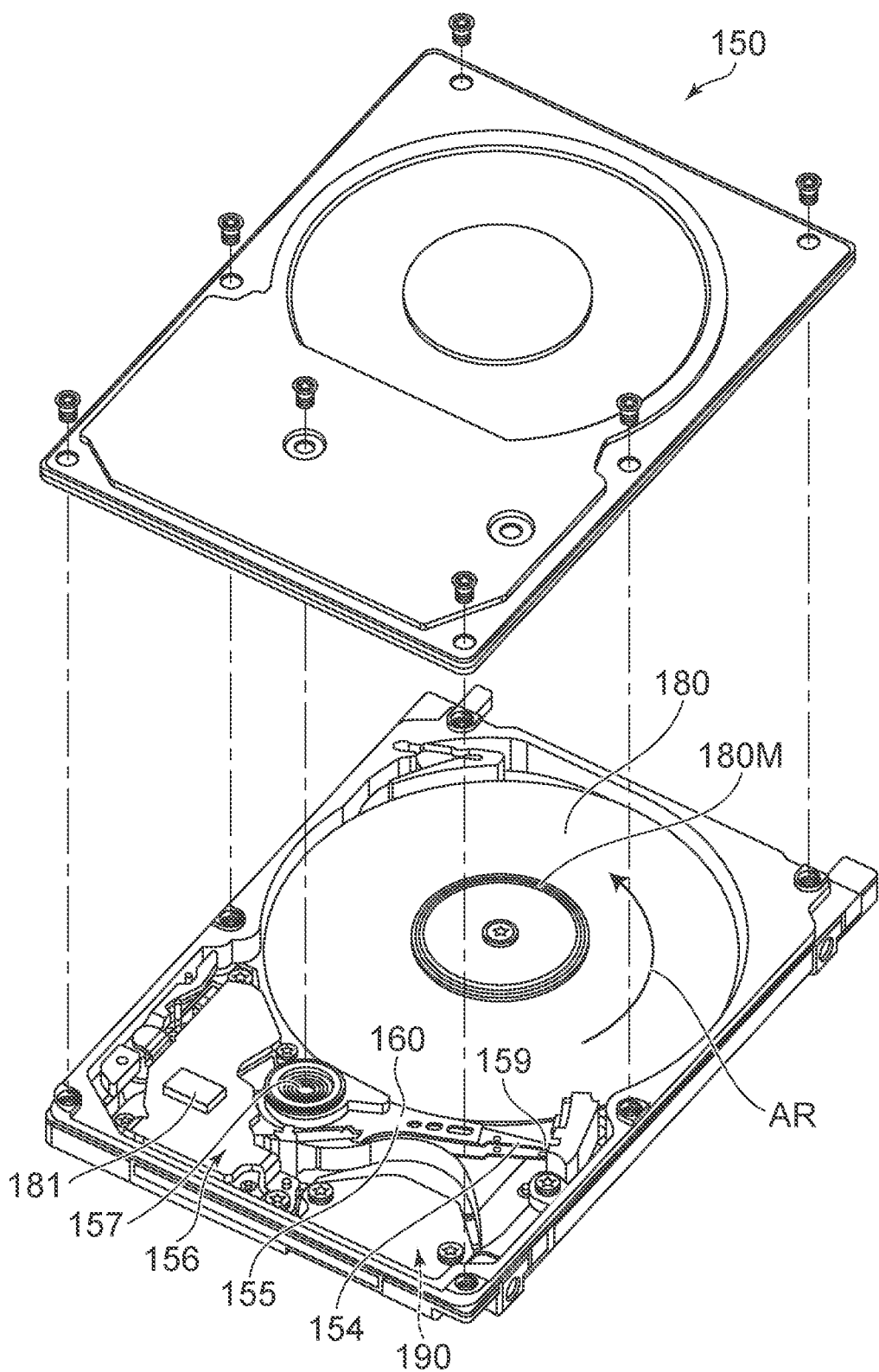
FIG. 15 is a schematic perspective view illustrating the magnetic recording device according to the embodiment.

FIG. 15 is a schematic perspective view illustrating the magnetic recording device according to the embodiment.

Figure 16A:
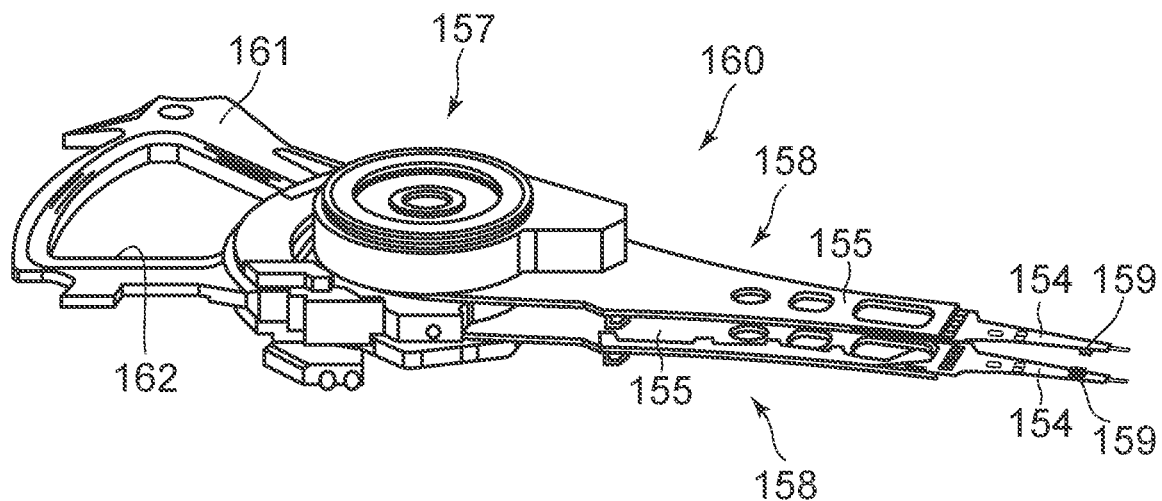
FIGS. 16A and 16B are schematic perspective views illustrating a part of the magnetic recording device according to the embodiment.
Figure 16B:
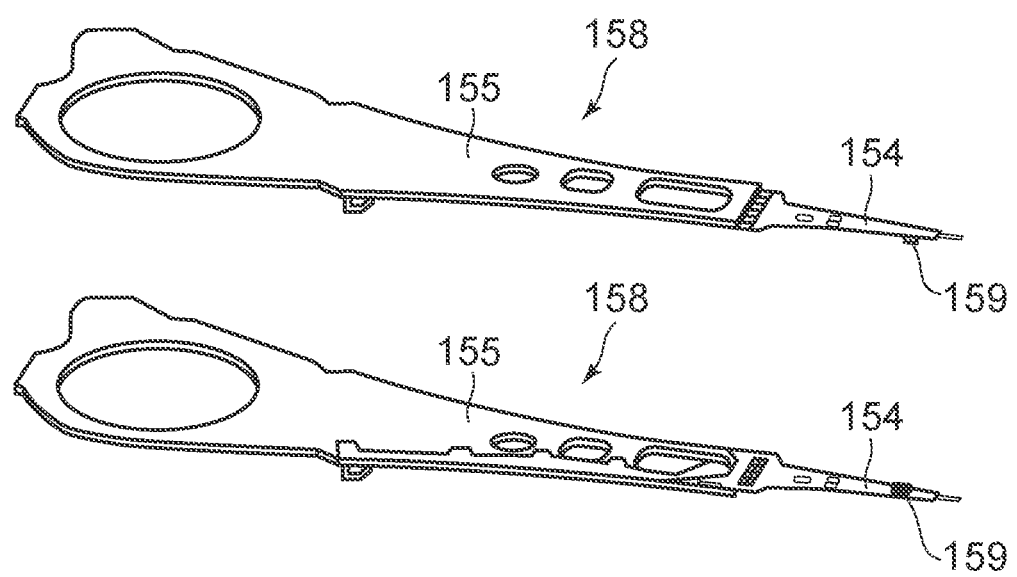

FIGS. 16A and 16B are schematic perspective views illustrating a part of the magnetic recording device according to the embodiment.

As shown in FIG. 15, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 16A is an enlarged perspective view of the head stack assembly 160, illustrating the configuration of a part of the magnetic recording device.

FIG. 16B is a perspective view illustrating the magnetic head assembly (head gimbal assembly: HGA) 158 that forms part of the head stack assembly 160.

As shown in FIG. 16A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 16B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following configurations (for example, technical proposals).

Configuration 1

A magnetic recording medium, comprising:
a first magnetic region;
a second magnetic region; and
a third magnetic region,
the second magnetic region being provided between the third magnetic region and the first magnetic region in a first direction from the third magnetic region to the first magnetic region,
a first composition ratio of a first Pt atomic concentration in the first magnetic region to a first Co atomic concentration in the first magnetic region being higher than a second composition ratio of a second Pt atomic concentration in the second magnetic region to a second Co atomic concentration in the second magnetic region,
a third composition ratio of a third Pt atom concentration in the third magnetic region to a third Co atom concentration in the third magnetic region being higher than the second composition ratio,
a first distance along the first direction between the second magnetic region and the first magnetic region being longer than a second distance along the first direction between the third magnetic region and the second magnetic region, or the first magnetic region being separated from the second magnetic region and the third magnetic region being in contact with the second magnetic region.

Configuration 2

The magnetic recording medium according to Configuration 1, wherein
a first exchange coupling strength between the second magnetic region and the first magnetic region is lower than a second exchange coupling strength between the third magnetic region and the second magnetic region.

Configuration 3

The magnetic recording medium according to Configuration 2, wherein
a ratio of the first exchange coupling strength to the second exchange coupling strength is not less than 0.1 and not more than 0.6.

Configuration 4
The magnetic recording medium according to any one of Configurations 1-3, wherein
   a ratio of a first anisotropic magnetic field in the first magnetic region to a second anisotropic magnetic field in the second magnetic region is not less than 1.4 and not more than 1.7.

Configuration 5
The magnetic recording medium according to Configuration 4, wherein
   a ratio of a third anisotropic magnetic field in the third magnetic region to the second anisotropic magnetic field is not less than 1.4 and not more than 1.7.

Configuration 6
The magnetic recording medium according to Configuration 5, wherein
   a ratio of the first anisotropic magnetic field to the third anisotropic magnetic field is not less than 0.9 and not more than 1.1.

Configuration 7
The magnetic recording medium according to any one of Configurations 1-6, further comprising:
   a first intermediate region provided between the second magnetic region and the first magnetic region, the first intermediate region being non-magnetic.

Configuration 8
The magnetic recording medium according to any one of Configurations 1-7, wherein
   the first magnetic region, the second magnetic region and the third magnetic region are granular magnetic regions.

Configuration 9
The magnetic recording medium according to Configuration 8, further comprising:
   a second intermediate magnetic region provided between the third magnetic region and the second magnetic region,
   the second intermediate magnetic region being a continuous magnetic region.

Configuration 10
A magnetic recording medium, comprising:
   a first magnetic region;
   a second magnetic region;
   a third magnetic region;
   a first intermediate region provided between the second magnetic region and the first magnetic region; and
   a second intermediate magnetic region provided between the third magnetic region and the second magnetic region,
   the second magnetic region being provided between the third magnetic region and the first magnetic region in a first direction from the third magnetic region to the first magnetic region,
   a first composition ratio of a first Co atomic concentration in the first magnetic region to a first Pt atomic concentration in the first magnetic region being higher than a second composition ratio of a second Co atomic concentration in the second magnetic region to a second Pt atomic concentration in the second magnetic region,
   a third composition ratio of a third Co atomic concentration in the third magnetic region to a third Pt atomic concentration in the third magnetic region being higher than the second composition ratio,
   the first magnetic region, the second magnetic region and the third magnetic region being granular magnetic region,
   the second intermediate magnetic region being a continuous magnetic region, and
   the first intermediate region being non-magnetic.

Configuration 11
The magnetic recording medium according to any one of Configurations 8-10, further comprising:
   a first continuous magnetic region,
   the first magnetic region being provided between the third magnetic region and the first continuous magnetic region.

Configuration 12
A magnetic recording medium, comprising:
   a first magnetic region;
   a second magnetic region;
   a third magnetic region;
   the second magnetic region being provided between the third magnetic region and the first magnetic region in a first direction from the third magnetic region to the first magnetic region,
   a first anisotropic magnetic field of the first magnetic region being larger than a second anisotropic magnetic field of the second magnetic region,
   a third anisotropic magnetic field in the third magnetic region being larger than the second anisotropic magnetic field,
   a first distance along the first direction between the second magnetic region and the first magnetic region being longer than a second distance along the first direction between the third magnetic region and the second magnetic region, or the first magnetic region being separated from the second magnetic region and the third magnetic region being in contact with the second magnetic region.

Configuration 13
The magnetic recording medium according to Configuration 12, wherein
   a ratio of the first anisotropic magnetic field to the second anisotropic magnetic field is not less than 1.4 and not more than 1.7.

Configuration 14
The magnetic recording medium according to Configuration 13, wherein
   a ratio of the third anisotropic magnetic field to the second anisotropic magnetic field is not less than 1.4 and not more than 1.7.

Configuration 15
The magnetic recording medium according to Configuration 14, wherein
   a ratio of the first anisotropic magnetic field to the third anisotropic magnetic field is not less than 0.9 and not more than 1.1.

Configuration 16
The magnetic recording medium according to any one of Configurations 12-15, wherein
   the first anisotropic magnetic field is 19000 Oe or more,
   the second anisotropic magnetic field is not less than 11000 Oe and not more than 15000 Oe, and
   the third anisotropic magnetic field is 18000 Oe or more.

Configuration 17
The magnetic recording medium according to any one of Configurations 1-16, further comprising:
   a non-magnetic substrate; and
   an intermediate layer,
   the third magnetic region being provided between the non-magnetic substrate and the first magnetic region,
   the intermediate layer being provided between the non-magnetic substrate and the third magnetic region, and the intermediate layer being soft magnetic.

Configuration 18

A magnetic recording device, comprising:
the magnetic recording medium according to any one of Configurations 1-17; and
a magnetic head,
the first magnetic region being located between the third magnetic region and the magnetic head.

Configuration 19

The magnetic recording device according to Configuration 18, wherein
the magnetic head is configured to perform a recording operation, and
in the recording operation, an alternating magnetic field is applied from the magnetic head to the magnetic recording medium, and a recording magnetic field is applied from the magnetic head to the magnetic recording medium.

Configuration 20

The magnetic recording device according to Configuration 18 or 19, wherein
the magnetic head includes
a first magnetic pole,
a second magnetic pole, and
a magnetic element provided between the first magnetic pole and the second magnetic pole, and
the magnetic element includes
a first magnetic layer provided between the first magnetic pole and the second magnetic pole,
a second magnetic layer provided between the first magnetic layer and the second magnetic pole,
a third magnetic layer provided between the second magnetic layer and the second magnetic pole, and
a fourth magnetic layer provided between the third magnetic layer and the second magnetic pole.

A magnetic recording medium and a magnetic recording device capable of improving the recording density can be obtained.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording mediums, magnetic heads and magnetic recording devices such as magnetic regions, magnetic poles, magnetic elements, magnetic layers, non-magnetic layers, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording mediums and magnetic recording devices practicable by an appropriate design modification by one skilled in the art based on the magnetic recording mediums and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording medium, comprising:
a first magnetic region;
a second magnetic region; and
a third magnetic region, the second magnetic region being provided between the third magnetic region and the first magnetic region in a first direction from the third magnetic region to the first magnetic region,
a first composition ratio of a first Pt atomic concentration in the first magnetic region to a first Co atomic concentration in the first magnetic region being higher than a second composition ratio of a second Pt atomic concentration in the second magnetic region to a second Co atomic concentration in the second magnetic region,
a third composition ratio of a third Pt atom concentration in the third magnetic region to a third Co atom concentration in the third magnetic region being higher than the second composition ratio,
a first distance along the first direction between the second magnetic region and the first magnetic region being longer than a second distance along the first direction between the third magnetic region and the second magnetic region, or the first magnetic region being separated from the second magnetic region and the third magnetic region being in contact with the second magnetic region,
wherein the magnetic recording medium is a perpendicular magnetization medium.

2. The magnetic recording medium according to claim 1, wherein
a first exchange coupling strength between the second magnetic region and the first magnetic region is lower than a second exchange coupling strength between the third magnetic region and the second magnetic region.

3. The magnetic recording medium according to claim 2, wherein
a ratio of the first exchange coupling strength to the second exchange coupling strength is not less than 0.1 and not more than 0.6.

4. The magnetic recording medium according to claim 1, wherein
a ratio of a first anisotropic magnetic field in the first magnetic region to a second anisotropic magnetic field in the second magnetic region is not less than 1.4 and not more than 1.7.

5. The magnetic recording medium according to claim 4, wherein
a ratio of a third anisotropic magnetic field in the third magnetic region to the second anisotropic magnetic field is not less than 1.4 and not more than 1.7.

6. The magnetic recording medium according to claim 5, wherein
a ratio of the first anisotropic magnetic field to the third anisotropic magnetic field is not less than 0.9 and not more than 1.1.

7. The magnetic recording medium according to claim 1, further comprising:
a first intermediate region provided between the second magnetic region and the first magnetic region, the first intermediate region being non-magnetic.

8. The magnetic recording medium according to claim 1, wherein
the first magnetic region, the second magnetic region and the third magnetic region are granular magnetic regions.

9. The magnetic recording medium according to claim 8, further comprising:
a second intermediate magnetic region provided between the third magnetic region and the second magnetic region,
the second intermediate magnetic region being a continuous magnetic region.

10. The magnetic recording medium according to claim 8, further comprising:
a first continuous magnetic region,
the first magnetic region being provided between the third magnetic region and the first continuous magnetic region.

11. The magnetic recording medium according to claim 1, wherein
a first anisotropic magnetic field in the first magnetic region is 19000 Oe or more,
a second anisotropic magnetic field in the second magnetic region is not less than 11000 Oe and not more than 15000 Oe, and
a third anisotropic magnetic field in the third magnetic region is 18000 Oe or more.

12. The magnetic recording medium according to claim 1, further comprising:
a non-magnetic substrate; and
an intermediate layer,
the third magnetic region being provided between the non-magnetic substrate and the first magnetic region,
the intermediate layer being provided between the non-magnetic substrate and the third magnetic region, and
the intermediate layer being soft magnetic.

13. A magnetic recording device, comprising:
the magnetic recording medium according to claim 1; and
a magnetic head,
the first magnetic region being located between the third magnetic region and the magnetic head.

14. The magnetic recording device according to claim 13, wherein
the magnetic head is configured to perform a recording operation, and
in the recording operation, an alternating magnetic field is applied from the magnetic head to the magnetic recording medium, and a recording magnetic field is applied from the magnetic head to the magnetic recording medium.

15. The magnetic recording device according to claim 13, wherein
the magnetic head includes
a first magnetic pole,
a second magnetic pole, and
a magnetic element provided between the first magnetic pole and the second magnetic pole, and
the magnetic element includes
a first magnetic layer provided between the first magnetic pole and the second magnetic pole,
a second magnetic layer provided between the first magnetic layer and the second magnetic pole,
a third magnetic layer provided between the second magnetic layer and the second magnetic pole, and
a fourth magnetic layer provided between the third magnetic layer and the second magnetic pole.

* * * * *